United States Patent
Zhao

(10) Patent No.: US 12,477,501 B2
(45) Date of Patent: Nov. 18, 2025

(54) POSITION DETERMINATION METHOD, APPARATUS AND V2X DEVICE

(71) Applicant: DATANG GOHIGH INTELLIGENT AND CONNECTED TECHNOLOGY (CHONGQING) CO., LTD., Chongqing (CN)

(72) Inventor: Rui Zhao, Beijing (CN)

(73) Assignee: DATANG GOHIGH INTELLIGENT AND CONNECTED TECHNOLOGY (CHONGQING) CO., LTD., Chongqing (CN)

(*) Notice: Subject to any disclaimer, the term of this patent is extended or adjusted under 35 U.S.C. 154(b) by 424 days.

(21) Appl. No.: 18/255,406

(22) PCT Filed: Nov. 8, 2021

(86) PCT No.: PCT/CN2021/129333
§ 371 (c)(1),
(2) Date: Jun. 1, 2023

(87) PCT Pub. No.: WO2022/116777
PCT Pub. Date: Jun. 9, 2022

(65) Prior Publication Data
US 2024/0023050 A1   Jan. 18, 2024

(30) Foreign Application Priority Data
Dec. 2, 2020   (CN) .......................... 202011387718.2

(51) Int. Cl.
*H04W 64/00* (2009.01)
*H04L 5/00* (2006.01)

(52) U.S. Cl.
CPC .......... *H04W 64/00* (2013.01); *H04L 5/0048* (2013.01)

(58) Field of Classification Search
CPC ... H04W 64/00; H04W 4/023; H04W 40/244; H04W 84/005; H04W 92/18;
(Continued)

(56) References Cited

U.S. PATENT DOCUMENTS

2012/0083288 A1 * 4/2012 Siomina ................ H04W 64/00
455/456.1
2015/0105097 A1   4/2015 Sun et al.
(Continued)

FOREIGN PATENT DOCUMENTS

CN    102540143 A    7/2012
CN    108291960 A    7/2018
(Continued)

OTHER PUBLICATIONS

Notice of Reasons for Refusal issued May 21, 2024 in Japanese Application No. 2023-532735.
(Continued)

*Primary Examiner* — Liem H. Nguyen
(74) *Attorney, Agent, or Firm* — Harness, Dickey & Pierce, P.L.C.

(57) ABSTRACT

A position determination method, apparatus, and V2X device are provided. The method applied to a first device includes: periodically broadcasting a first Positioning Reference Signal PRS; receiving a second PRS fed back according to the first PRS by a second device; transmitting a third PRS to the second device according to the second PRS; wherein, the second device determines a position based on the first PRS, the second PRS, and the third PRS.

16 Claims, 4 Drawing Sheets

(58) Field of Classification Search
CPC ......... H04W 4/025; H04W 4/44; H04W 4/40; H04W 4/02; H04W 16/10; H04W 28/0231; H04W 40/20; H04W 24/08; H04W 72/0446; H04W 72/1263; H04W 72/25; H04W 72/542; H04L 5/0048; G01S 13/765

See application file for complete search history.

(56) References Cited

U.S. PATENT DOCUMENTS

| | | | |
|---|---|---|---|
| 2018/0217228 A1* | 8/2018 | Edge | H04W 64/00 |
| 2018/0302280 A1 | 10/2018 | Jiang et al. | |
| 2018/0335514 A1 | 11/2018 | Dees et al. | |
| 2019/0302220 A1 | 10/2019 | Kumar et al. | |
| 2019/0327706 A1* | 10/2019 | Agnihotri | H04W 24/10 |
| 2020/0236718 A1* | 7/2020 | Sundararajan | G01S 5/0205 |
| 2021/0080560 A1* | 3/2021 | Sharp | G01S 5/0081 |
| 2021/0160810 A1* | 5/2021 | Zhang | G01S 5/10 |
| 2021/0174532 A1 | 6/2021 | Adachi | |
| 2021/0297216 A1* | 9/2021 | Shreevastav | H04W 4/029 |
| 2021/0379990 A1 | 12/2021 | Tucci et al. | |
| 2022/0015056 A1* | 1/2022 | Choi | G01S 5/0244 |
| 2022/0043099 A1 | 2/2022 | Da et al. | |
| 2022/0279310 A1 | 9/2022 | Xiao et al. | |
| 2022/0377697 A1 | 11/2022 | Bi et al. | |
| 2023/0131529 A1 | 4/2023 | Kim et al. | |
| 2023/0171068 A1 | 6/2023 | Choi et al. | |
| 2023/0171750 A1* | 6/2023 | Lee | H04L 5/005 370/329 |

FOREIGN PATENT DOCUMENTS

| | | |
|---|---|---|
| CN | 110351682 A | 10/2019 |
| CN | 110536234 A | 12/2019 |
| CN | 111093154 A | 5/2020 |
| CN | 111343579 A | 6/2020 |
| CN | 111919132 A | 11/2020 |
| CN | 112203223 A | 1/2021 |
| JP | 2017-501375 A | 1/2017 |
| JP | 2020-517178 A | 6/2020 |
| JP | 2021-092918 A | 6/2021 |
| JP | 2021-191009 A | 12/2021 |
| JP | 2023-523616 A | 6/2023 |
| JP | 2023-547825 A | 11/2023 |
| WO | 2019/122080 A1 | 6/2019 |
| WO | WO-2019/191307 A1 | 10/2019 |
| WO | WO-2020/123812 A1 | 6/2020 |
| WO | WO-2020/150589 A1 | 7/2020 |

OTHER PUBLICATIONS

Qualcomm Inc., "RAT-dependent DL and UL R positioning techniques," 3GPP TSG-RAN WG1 Meeting AH1901, R1-1900916, Jan. 21, 2019.
3GPP TSG RAN WG1 #100bis, "Discussion of Rel-16 UE features for NR positioning" Apr. 20-30, 2020.
International Search Report for International Application No. PCT/CN2021/129333 mailed on Jan. 28, 2022.
3GPP TSG RAN WG1 #103-e "Potential positioning enhancements" Oct. 26-Nov. 13, 2020.
Office Action issued Jan. 20, 2021 in Chinese Application No. 202011387718.2.

* cited by examiner

POSITION DETERMINATION METHOD, APPARATUS AND V2X DEVICE

CROSS-REFERENCE TO RELATED APPLICATIONS

This application is a national phase under 35 U.S.C. § 371 of PCT International Application No. PCT/CN2021/129333 which has an International filing date of Nov. 8, 2021, which claims priority to CN application No. 202011387718.2, filed Dec. 2, 2020, the entire contents of each of which are hereby incorporated by reference.

TECHNICAL FIELD

The present disclosure relates to the technical field of communications, and in particular, relates to a position determination method, a position determination apparatus and a V2X device.

BACKGROUND

Currently, Vehicle-to-Everything (V2X) technology is supported by more ecosystems. C-V2X (C represents a Cellular network) is a V2X technology based on the cellular network, which can make vehicles communicate with other surrounding vehicles and infrastructure and share real-time road information, and is a key technology to realize road traffic safety and automatic driving. The C-V2X includes Long Term Evolution (LTE)-V2X and New Radio (NR)-V2X, supports a sidelink and uplink/downlink communication of a cellular network. A C-V2X equipment can communicate with a base station within signal coverage of the cellular network; C-V2X equipment can communicate over the sidelink both inside and outside the coverage of the cellular network.

A V2X application needs to know an exact position of a V2X device, especially a terminal (including OBU\ Vulnerable Road User (VRU), etc.). A conventional positioning method is based on a Global Navigation Satellite System (GNSS) or an enhanced GNSS positioning method, but in areas where a GNSS signal coverage (such as urban canyons) is poor and areas (underground passages, underground parking garages, coal mine underground, underground transportation passages, etc.) without the GNSS signal coverage, other positioning technologies are needed to achieve positioning or improve a positioning accuracy

SUMMARY

The present disclosure provides a position determination method, a position determination apparatus, and a V2X device, which solve the problem of the prior art that positioning cannot be performed in areas where a GNSS signal coverage is poor or there is no GNSS signal coverage or a positioning error is significant.

In a first aspect, embodiments of the present disclosure provide a position determination method performed by a first device. The method includes:
  periodically broadcasting a first Positioning Reference Signal (PRS);
  receiving a second PRS fed back according to the first PRS by a second device;
  transmitting a third PRS to the second device according to the second PRS;
  wherein, the second device determines a position based on the first PRS, the second PRS, and the third PRS.

Optionally, when broadcasting the first PRS, at least one of following information is carried:
  identification of the first device;
  periodicity of transmitting the first PRS;
  time-frequency assignment of a resource for broadcasting the first PRS;
  location information of the first device.

Optionally, after transmitting the third PRS to the second device according to the second PRS, the method further includes:
  determining third time information and fourth time information;
  transmitting the third time information and the fourth time information to the second device;
  wherein, the third time information is third time difference between a time instant of receiving the second PRS and a time instant of transmitting the first PRS; the fourth time information is fourth time difference between a time instant of transmitting the third PRS and a time instant of receiving the second PRS;
  wherein, the third time information and the fourth time information are used by the second device to determine the position.

Optionally, transmitting the third time information and the fourth time information to the second device includes:
  when time instants of periodically transmitting the first PRS are reached, broadcasting the first PRS which simultaneously carries the fourth time information or both the third time information and the fourth time information, and simultaneously carries at least one of the following:
  identification information of the second device;
  sequence information of the second PRS;
  resource assignment information of transmitting the second PRS;
  a resource index of transmitting the second PRS.

Optionally, before transmitting the third PRS to the second device according to the second PRS, the method further includes:
  determining the number N of first time domain resources between a time domain resource of receiving the first PRS by the second device and a time domain resource of transmitting the second PRS by the second device, wherein N is a positive integer and N≥1;
  determining that the number of time domain resources between a time domain resource of receiving the second PRS and a time domain resource of transmitting the third PRS is equal to the number of the first time domain resources;
  determining time domain resources of transmitting the third PRS, and determining a resource of transmitting the third PRS on the time domain resources.

Optionally, when transmitting the third PRS to the second device, at least one of following information is carried:
  identification of the first device;
  time domain assignment of a resource for broadcasting the first PRS; time-frequency assignment of a resource for broadcasting the first PRS;
  first time difference between a time instant of receiving the second PRS and a time instant of transmitting the first PRS;
  identification of the second device;
  sequence information of the second PRS;
  resource assignment information of transmitting the second PRS;
  a resource index of transmitting the second PRS.

Optionally, before broadcasting the first PRS, the method further includes:

determining a resource of transmitting the first PRS and/or periodicity of transmitting the first PRS by at least one of following ways:
- a positioning server configuration;
- a radio resource control RRC configuration;
- a pre-configuration;
- scheduling the resource of transmitting the PRS for the first device by a base station gNB/eNB and configuring the periodicity of transmitting the PRS;
- autonomously selecting the resource of transmitting the first PRS by the first device through sensing a PRS transmission resource pool of the first device;
- autonomously adjusting the periodicity of transmitting the first PRS by the first device according to a congestion level of receiving the PRS transmitted by the second device.

Optionally, in a case that the first device operates in a sidelink, autonomously selecting the resource of transmitting the first PRS by the first device through sensing the PRS transmission resource pool of the first device includes:

measuring a measurement metrics used for resource exclusion on a transmission resource in a resource pool available for PRS transmission, prior to triggering transmission of a Physical Sidelink Shared Channel (PSSCH) of a PRS;

performing resource exclusion for a resource indicated for reservation based on the measurement metrics and selecting a transmission resource from remaining available resources;

when determining that a PRS transmission resource occupied by the first device is unavailable, or when determining that one or more of the PRS transmission resource occupied by the first device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, reselecting the resource that is unavailable.

Optionally, the measurement metrics include at least one of following:
- a Reference Signal Receiving Power (RSRP) of the PRS transmitted by the third device;
- an RSRP of a Demodulation Reference Signal (DMRS) of a PSSCH transmitted in association with the PRS transmitted by the third device;
- an RSRP of the PSCCH of a control signaling associated with the PRS transmitted by the third device;
- a received power of a Preamble associated with the PRS transmitted by the third device;
- a Received Signal Strength Indication (RSSI) of the PRS transmitted by the third device,
wherein the third device is a device that shares a PRS transmission resource pool with the first device.

Optionally, performing the resource exclusion for the resource indicated for reservation based on the measurement metrics and selecting the transmission resource from remaining available resources includes:

selecting the resource of transmitting the first PRS from remaining available candidate transmission resources; or selecting, from the remaining available candidate transmission resources, the resource of transmitting the first PRS and at least one of following transmission resources: a PSSCH transmission resource associated with the first PRS; a PSCCH transmission resource associated with the first PRS; a preamble transmission resource associated with the first PRS.

Optionally, autonomously selecting the resource of transmitting the first PRS by the first device through sensing the PRS transmission resource pool of the first device includes:

if there exists a fourth device whose distance from the first device is within a predetermined range, enabling a time interval between the PRS transmission resource of the first device and a PRS transmission resource of the fourth device to be less than a configured threshold.

Optionally, the method further includes:

stopping broadcasting the PRS, according to a server configuration or a network-side configuration; and/or stopping broadcasting the PRS in case that the number of consecutive cycles of not receiving the PRS transmitted by the second device reaches a configured threshold value.

Optionally, a second resource pool for broadcasting the first PRS is orthogonal to a first resource pool in a time domain, or is orthogonal to the first resource pool both in a time domain and in a frequency domain;

wherein the first resource pool is a resource pool used by the second device for transmitting a PRS.

In a second aspect, the embodiments of the present disclosure provide a position determination method performed by a second device. The method includes:

transmitting a second Positioning Reference Signal (PRS) to a first device when receiving a first PRS broadcast by the first device;

receiving a third PRS transmitted by the first device to the second device according to the second PRS;

determining a position according to the first PRS, the second PRS and the third PRS.

Optionally, the method further includes:

determining first time information and second time information, wherein the first time information is first time difference between a time instant of transmitting the second PRS and a time instant of receiving the first PRS, and the second time information is second time difference between a time instant of receiving the third PRS and a time instant of transmitting the second PRS;

obtaining third time information and fourth time information transmitted by the first device, wherein the third time information is third time difference between a time instant of receiving the second PRS and a time instant of transmitting the first PRS, and the fourth time information is fourth time difference between a time instant of transmitting the third PRS and a time instant of receiving the second PRS;

wherein, determining the position according to the first PRS, the second PRS and the third PRS includes determining a position according to the first time information, the second time information, the third time information and the fourth time information.

Optionally, the third time information is transmitted along with the third PRS transmitted by the first device, or is transmitted along with the first PRS broadcast again after the third PRS;

the fourth time information is transmitted along with the first PRS broadcast again by the first device after the third PRS.

Optionally, the number of time domain resources between a time domain resource of receiving the first PRS and a time domain resource of transmitting the second PRS is equal to the number of time domain resources between a time domain resource of receiving the second PRS and a time domain resource of transmitting the third PRS, and is denoted as N, wherein N is a positive integer and N≥1.

Optionally, determining the position according to the first time information, the second time information, the third time information and the fourth time information includes:

determining a Time of Arrival (TOA) of signal transmission between the first device and the second device according to a formula:

$$T_{TOA} = \frac{(\text{third time information} - \text{first time information}) + (\text{second time information} - \text{fourth time information})}{4}$$

wherein, $T_{TOA}$ is the time of arrival TOA; and determining the position according to the TOA.

Optionally, when transmitting the second PRS to the first device, at least one of following information is carried:
identification of the second device;
identification of the first device;
sequence information of the first PRS;
resource assignment information of transmitting the first PRS;
a resource index of transmitting the first PRS.
the number N of time domain resources between a time domain resource of receiving the first PRS and a time domain resource of transmitting the second PRS, wherein N is a positive integer and N≥1;
a time domain resource location of transmitting a third PRS by the first device;
a time-frequency resource location of transmitting a third PRS by the first device;
periodicity of transmitting the second PRS by the second device;
time-frequency assignment of a resource used to transmit the second PRS and/or information carried in association with the second PRS.

Optionally, before transmitting the second PRS to the first device, the method further includes:
determining the resource of transmitting the second PRS by at least one of the following:
a positioning server configuration;
a radio resource control RRC configuration;
a pre-configuration;
scheduling the resource of transmitting the second PRS for the second device by a base station gNB/eNB and configuring the periodicity of transmitting the second PRS;
autonomously selecting the resource of transmitting the second PRS by the second device through sensing a PRS transmission resource pool of the second device;
determining, according to PRS transmission periodicity of transmitting a PRS by the first device, the resource of periodically transmitting the second PRS by the second device.

Optionally, autonomously selecting the resource of transmitting the second PRS by the second device through sensing the PRS transmission resource pool of the second device includes:
measuring a measurement metrics used for resource exclusion on a transmission resource in a resource pool available for PRS transmission, prior to triggering transmission of a Physical Sidelink Shared Channel (PSSCH) of a PRS;
performing resource exclusion for a resource indicated for reservation based on the measurement metrics and selecting a transmission resource from remaining available resources;
when determining that a PRS transmission resource occupied by the second device is unavailable, or when determining that one or more of the PRS transmission resource occupied by the second device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, reselecting the resource that is unavailable;
when receiving the PRS from the adjacent first device, determining the resource of transmitting the second PRS, or determining the resource of transmitting the second PRS from candidate resources which do not periodically overlap with the PRS of the first device.

Optionally, when autonomously selecting the resource of transmitting the second PRS, the method further includes:
determining a resource of receiving the third PRS;
wherein, the number of time domain resources between the resource of receiving the third PRS and the resource of transmitting the second PRS is equal to the number of time domain resources between the resource of transmitting the second PRS and the resource of receiving the first PRS.

Optionally, the measurement metrics includes at least one of following:
a Reference Signal Received Power (RSRP) of a PRS transmitted by a fifth device;
an RSRP of a Demodulation Reference Signal (DMRS) of a PSSCH transmitted simultaneously with the PRS transmitted by the fifth device;
an RSRP of a PSCCH of a control signaling associated with the PRS transmitted by the fifth device;
a received power of a preamble associated with the PRS transmitted by the fifth device;
a Received Signal Strength Indication (RSSI) of the PRS transmitted by the fifth device,
wherein the fifth device is a device that shares a PRS transmission resource pool with the second device.

Optionally, performing the resource exclusion for the resource indicated for reservation based on the measurement metrics and selecting the transmission resource from the remaining available resources includes:
selecting the resource of transmitting the second PRS from remaining available PRS candidate transmission resources; or
selecting, from the remaining available candidate transmission resources, the resource of transmitting the second PRS and at least one of following transmission resources:
a PSSCH transmission resource associated with the second PRS;
a PSCCH transmission resource associated with the second PRS;
a preamble transmission resource associated with the second PRS.

Optionally, the resource selection window satisfies following conditions:
both a start and an end of the resource selection window are less than T/2;
a start of the resource selection window is greater than or equal to a first time duration; T is periodicity of transmitting a PRS by the first device; the first time duration is equal to a second time duration, or is equal to a sum of the second time duration and a preset PRS detection time threshold and a preset PSSCH decoding time threshold, wherein, the second time duration is:
a preset time threshold of preparation of PRS transmission; or
preset time thresholds of preparation of PRS and PSSCH transmission; or
preset time thresholds of preparation of PRS, PSSCH, and PSCCH transmission; or
preset time thresholds of preparation of PRS and preamble transmission; or
preset time thresholds of preparation of PRS, PSSCH and preamble transmission; or
preset time thresholds of preparation of PRS, PSSCH, PSCCH and preamble transmission.

Optionally, the first resource pool for transmitting the second PRS is orthogonal to the second resource pool in a time domain, or orthogonal to the second resource pool both in a time domain and in a frequency domain; wherein, the second resource pool is the resource pool used by the first device to transmit a PRS.

In a third aspect, the embodiments of the present disclosure provide a V2X device, the V2X device being a first device, the V2X device includes:
a transceiver, a memory, a processor and a computer program stored on the memory and executable by the processor, wherein when the processor executes the computer program, the processor implements the position determination method according to the first aspect.

In a fourth aspect, the embodiments of the present disclosure provide a V2X device, the V2X device being a second device, the V2X device includes:
a transceiver, a memory, a processor and a computer program stored on the memory and executable by the processor, wherein when the processor executes the computer program, the processor implements the position determination method according to the second aspect.

In a fifth aspect, the embodiments of the present disclosure provide a position determination apparatus applied to a first device. The apparatus includes:
a first transmission module configured to periodically broadcast a first Positioning Reference Signal (PRS);
a first reception module configured to receive a second PRS fed back according to the first PRS by a second device;
a second transmission module configured to transmit a third PRS to the second device according to the second PRS.

In a sixth aspect, the embodiments of the present disclosure provide a position determination apparatus applied to a second device. The apparatus includes:
a third transmission module configured to transmit a second Positioning Reference Signal (PRS) to a first device when receiving a first PRS broadcast by the first device;
a second reception module configured to receive a third PRS transmitted by the first device to the second device according to the second PRS;
a position calculation module configured to determine a position according to the first PRS, the second PRS and the third PRS.

In a seventh aspect, the embodiments of the present disclosure provide a computer readable storage medium, including a computer program stored on the computer readable storage medium, wherein when the computer program is executed by a processor, the processor implements steps of the position determination method according to the first aspect, or steps of the position determination method according to the second aspect.

The beneficial effects of the above technical solutions of the present disclosure are:

in the above technical solutions, by periodically broadcasting a first PRS, receiving a second PRS fed back according to the first PRS by a second device, transmitting a third PRS to the second device according to the second PRS, the second device determines a position based on the first PRS, the second PRS, and the third PRS, thereby solve the problem that positioning cannot be performed by the second device in areas where a GNSS signal coverage is poor or there is no GNSS signal coverage or a positioning error is significant.

DETAILED DESCRIPTION

Figure 1:
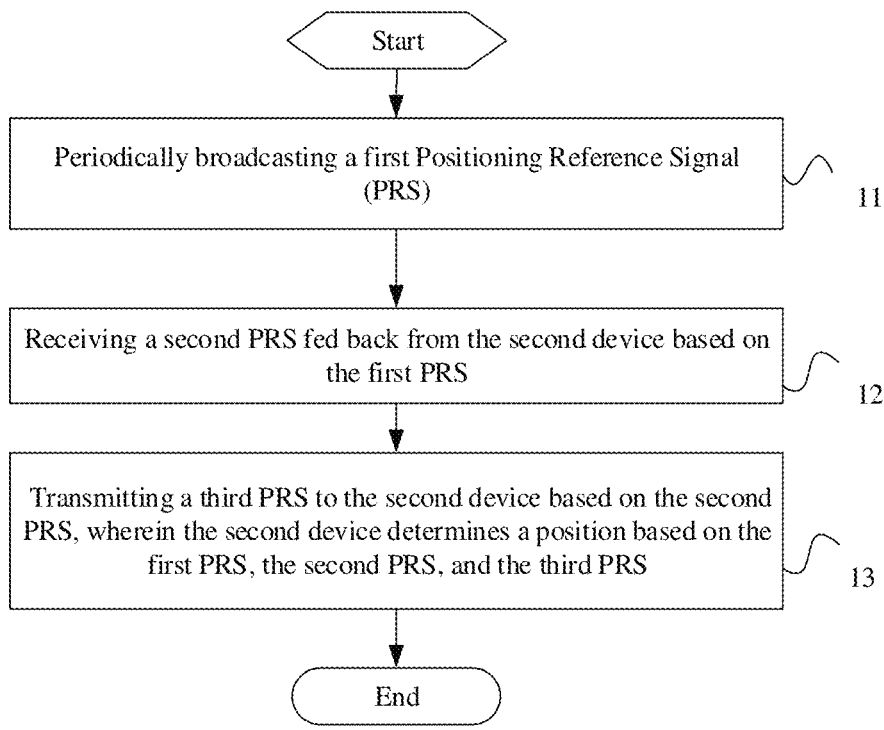
FIG. 1 shows a first schematic flowchart of a position determination method according to embodiments of the present disclosure.

In order to make technical problems to be addressed by the present disclosure, technical solutions, and advantages of the present application clearer, description is provided below in detail in conjunction with the accompanying drawings and specific embodiments. In the following description, specific details such as specific configurations and components are provided only to aid in full understanding of the embodiments of the present disclosure. Accordingly, it should be clear to those skilled in the art that various changes and modifications can be made to the embodiments described herein without departing from the scope and the spirit of the present disclosure. In addition, descriptions of known functions and constructions have been omitted for sake of clarity and brevity.

It is to be understood that references throughout the specification to "an embodiment" or "the embodiment" mean that a particular feature, structure or characteristic associated with an embodiment is included in at least one embodiment of the present disclosure. Thus, "in an embodiment" or "in the embodiment" appearing throughout the specification does not necessarily refer to the same embodiment. In addition, these particular features, structures, or characteristics may be combined in any suitable manner in one or more embodiments.

In various embodiments of the present disclosure, it should be understood that sizes of serial numbers of processes described below do not imply a sequence of execution, and that the sequence of execution of the processes should be determined by their function and inherent logic, and should not constitute any limitation on the processes implemented in the embodiments of the present disclosure.

In addition, such terms as "system" and "network" are often used interchangeably herein.

In the embodiments provided in the present application, it is understood that "B corresponding to A" means that B is associated with A and that B can be determined based on A. However, it is also understood that determining B based on A does not mean determining B based on A alone, but also determining B based on A and/or other information.

In the embodiments of the present disclosure, forms of access networks are not limited, which may include a Macro Base Station, a Pico Base Station, a Node B (i.e., a 3G mobile base station), an enhanced Node B (eNB), a Home enhanced Node B (a Femto eNB or a Home eNode B or a Home eNB or HeNB), relay stations, access points, RRU (Remote Radio Unit), RRH (Remote Radio Head), and other access networks. User terminal can be a cellular phone (or a mobile phone), or other devices capable of transmitting or receiving radio signals, including user devices, personal digital assistants (PDAs), wireless modems, wireless communication devices, handheld devices, laptops, cordless phones, wireless local loop (WLL) stations, CPE (Customer Premise Equipment) or a mobile smart hotspot, a smart home appliance, or other device that can spontaneously communicate with a mobile communication network without human operation, etc.

It should be noted that PRSs expressed in the present disclosure are all Sidelink Positioning Reference Signals or other reference signals that can be used for Sidelink positioning, abbreviations of which can also be expressed as at least one of SL-PRS and S-PRS. The position determination method, the position determination apparatus and the V2X device described herein can work at least on a sidelink in a V2X scenario, and can solve the problem of the prior art that positioning cannot be performed in an area with a poor GNSS signal coverage or no GNSS signal coverage or that a positioning error is significant.

First Embodiment

As shown in FIG. 1, the embodiments of the present disclosure provide a position determination method applied to a first device, wherein the first device can be a V2X device, including but not limited to: a stationary device such as a Road Side Unit (RSU), a base station (gNB), and other devices with fixed positions. The method specifically includes the following steps:

Step 11: periodically broadcasting a first Positioning Reference Signal (PRS);

Periodically broadcasting the first PRS or semi-persistently periodically broadcasting the first PRS includes: broadcasting the first PRS in case of receiving a PRS transmitted by a second V2X device, i.e., a second device; or broadcasting the first PRS according to configuration from a server or according to configuration from a network side or according to pre-configuration; or broadcasting the first PRS in case of receiving a position request transmitted by a second V2X device or a positioning server on receiving a position request from a second V2X device or a positioning server.

Step 12: receiving a second PRS fed back from the second device based on the first PRS;

Step 13: transmitting a third PRS to the second device based on the second PRS, wherein, the second device determines a position based on the first PRS, the second PRS, and the third PRS.

Specifically, when transmitting the third PRS to the second device, at least one of the following information is carried:
  identification of the first device;
  time domain assignment of a resource for broadcasting the first PRS; time-frequency assignment of a resource for broadcasting the first PRS;
  first time difference between a time instant of receiving the second PRS and a time instant of transmitting the first PRS;
  identification of the second device;
  sequence information of the second PRS;
  resource assignment information of transmitting the second PRS;
  a resource index of transmitting the second PRS.

It is to be noted that the sequence information of the second PRS, the resource location of transmitting the second PRS and the resource index of transmitting the second PRS are used to implicitly indicate an identity of the second device, which can achieve an effect that the second device, using the above information, can determine that information carried in the PRS is available to itself, while the first device cannot know specific identification of the second device having a positioning need, achieving an effect of privacy protection and tracking prevention.

Figure 2:
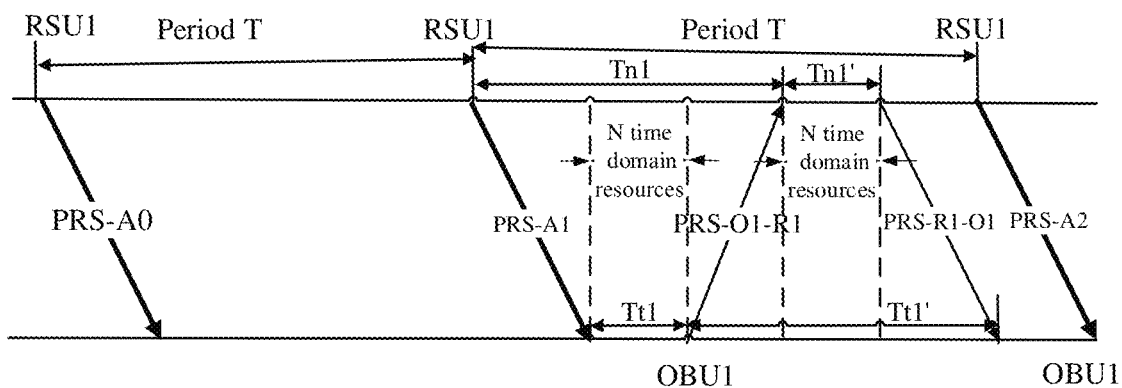
FIG. 2 shows a first schematic diagram of sending a PRS between a first device and a second device according to embodiments of the present disclosure.

Exemplarily, as shown in FIG. 2, in which the first device is RSU1 and the second device is OBU1. In this example, illustrated PRS-A0, PRS-A1, and PRS-A2 are the first PRSs broadcast periodically by the first device, periodicity of the PRSs is T. The second device feeds back PRS-O1-R1 (second PRS) after receiving the PRS-A1, and the first device sends PRS-R1-O1 (third PRS) to the second device after receiving PRS-O1-R1.

In this embodiment, when a synchronization error between the first device and the second device is negligible, then the second device may perform distance measurement based on the received first PRS or the third PRS, and further determine a position of the device, or the first device may perform distance measurement based on the received second PRS and further determine the position of the second device. In this way, the problem can be addressed that positioning the second device cannot be effectively performed in areas where the GNSS signal coverage is poor or there is no GNSS signal coverage. Moreover, through periodically broadcasting the first PRS and the carried positioning information by an anchor node (the first device) and feeding back the second PRS by the second device between two transmissions, a situation can be avoided that unicast connection establishment leads to a large positioning delay and point-to-point positioning signal interaction causes a large positioning delay, thus effectively reducing the delay. Meanwhile, there is no need for the first device to send additionally relevant timing information, one data sending process is reduced and delay reduction is equally achieved.

Specifically, when broadcasting the first PRS, at least one of the following information is carried:
identification of the first device;
periodicity of transmitting the first PRS;
time-frequency assignment of a resource for broadcasting the first PRS;
location information of the first device.

Exemplarily, as shown in FIG. 2, since no PRS transmitted by other OBUs and VRUs have been received in a previous period, identity information, location information, and relevant information of the first PRS related to the first device are carried when the first device transmits the first PRS (PRS-A1) through broadcasting, so that the second device can determine a location according to the above information.

In an embodiment, after step 13 above, the method include:
determining the third time information and fourth time information;
transmitting the third time information and the fourth time information to the second device;
wherein, the third time information is third time difference between a time instant of receiving the second PRS and a time instant of sending the first PRS; the fourth time information is fourth time difference between a time instant of sending the third PRS and a time instant of receiving the second PRS; wherein, the third time information and the fourth time information are used by the second device to determine the position.

In this embodiment, when a synchronization error between the first device and the second device is not negligible, the second device can achieve accurate position determination by obtaining third time information and fourth time information determined and transmitted by the first device. Specifically, it can be seen that in the second embodiment, the second device carries out steps of position determination according to the first time information, the second time information, the third time information and the fourth time information.

In an embodiment, transmitting the third time information and the fourth time information to the second device includes: when time instants of periodically sending the first PRS are reached, broadcasting the first PRS which simultaneously carries the fourth time information or both the third time information and the fourth time information, and simultaneously carries at least one of the following:
identification information of the second device;
sequence information of the second PRS;
resource assignment information of transmitting the second PRS;
a resource index of transmitting the second PRS.

In this embodiment, one way of transmitting third time information is to carry the third positioning information when transmitting the third PRS, and another way of transmitting third time information is to carry the third positioning information when broadcasting the first PRS after transmitting the third PRS. The fourth time information is carried when broadcasting the first PRS after transmitting the third PRS. After transmitting the third PRS, at least one of the identification information of the second device, the sequence information of the second PRS, the resource location of transmitting the second PRS and the resource index of transmitting the second PRS is carried when broadcasting the first PRS, so that the second device can obtain the third time information or the third time information and the fourth time information for position determination from the broadcast the first PRS.

Moreover, the first device enables number of time values related to TOA calculation associated with the second device to be carried in the broadcast. In case of achieving delay reduction and information interaction cost reduction, through design of interactive information, each second device with positioning requirements can obtain effective calculation data, and it is ensured that when receiving calculation data, such as OBU/VRU, of other devices, the other devices do not have the first time information and the second time information locally, so tracks of other devices cannot be traced, which ensures privacy security.

Meanwhile, it needs to be pointed out that the sequence information of the second PRS, the resource position of transmitting the second PRS, and the resource index of transmitting the second PRS are used to implicitly indicate the identity of the second device. The effect that can be realized is that the second device uses the above information to determine the information carried in the PRS is available to itself. However, the first device cannot know the specific identification of the second device having positioning requirements, which also achieves the effect of privacy protection and tracking prevention.

In an embodiment, prior to the step 13 above, the method further includes:
determining the number N of first time domain resources between the time domain resource of receiving the first PRS by the second device and the time domain resource of transmitting the second PRS by the second device, N is a positive integer and N≥1;
determining that the number of time domain resources between the time domain resource of receiving the second PRS and the time domain resource of transmitting the third PRS is the same as the number of the first time domain resources;
determining a time domain resource of transmitting the third PRS, and determining a resource of transmitting the third PRS on the time domain resource.

It should be pointed out that the resource of transmitting the third PRS determined on the time domain resource include a time domain resource and a frequency domain resource.

In this embodiment, by enabling that the number of time domain resources between the time domain resource of receiving the second PRS and the time domain resource of transmitting the third PRS is the same as the number of the first time domain resources, it can be ensured that the synchronization error between the first device and the second device is insignificant when using two-way RTT to calculate the TOA, and the error of a local frequency offset can be ignored. In this way, it is addressed that the frequency offset of a local timer at receiving and sending ends of the positioning signal leads to inaccurate positioning.

In an embodiment, before the above step 11, the method further includes:
determining the resource of transmitting the first PRS and/or the periodicity of transmitting the first PRS by at least one of following ways:
a positioning server configuration;
a radio resource control RRC configuration;
a pre-configuration;
scheduling the resource of transmitting the PRS for the first device by the base station gNB/eNB and configuring the periodicity of transmitting the PRS;

autonomously selecting the resource of transmitting the first PRS by the first device through sensing a PRS transmission resource pool of the first device;

autonomously adjusting the periodicity of transmitting the first PRS by the first device according to a congestion level of receiving PRS transmitted by the second device.

It is to be noted that the first device and the second device have the same understanding of a unit of the period, which may be agreed through network configuration parameters or pre-configured parameters or protocols; the unit of the periodicity of transmitting the first PRS may be any of the following: milliseconds (Ms); the number of time domain resources on a physical time domain resource index, which include, but not are limited to, physical slots, physical subframes, Orthogonal Frequency Division Multiplexing (OFDM) symbols on physical slots or physical subframes; the number of time domain resources on a logical time domain resource index, which include, but are not limited to, logical slots, logical subframes, or OFDM symbols on logical slots or logical subframes.

Further, in an embodiment, in case that the first device operates on a sidelink, autonomously selecting the resource of transmitting the first PRS by the first device through sensing the PRS transmission resource pool of the first device:

measuring a measurement metrics used for resource exclusion on a transmission resource in the resource pool available for PRS transmission prior to triggering transmission of a Physical Sidelink Shared Channel (PSSCH) of the PRS;

performing a resource exclusion for a resource indicated for reservation based on the measurement metrics and selecting a transmission resource from remaining available resources, wherein, upon determining that a PRS transmission resource occupied by the first device is unavailable, or upon determining that one or more of the PRS transmission resource occupied by the first device, a PSSCH transmission resource associated with the PRS transmission resource, a PSCCH transmission resource associated with the PRS transmission resource, and a preamble transmission resource associated with the PRS transmission resource are unavailable, reselecting the unavailable resource.

Specifically, the measurement metrics include at least one of following:

a Reference Signal Received Power (RSRP) of the PRS transmitted by the third device;

an RSRP of a Demodulation Reference Signal (DMRS) of a PSSCH associated with the PRS transmitted by the third device;

an RSRP of the PSCCH of a control signaling associated with the PRS transmitted by the third device;

a received power of a Preamble associated with the PRS transmitted by the third device;

a Received Signal Strength Indication (RSSI) of the PRS transmitted by the third device, wherein the third device is a device that shares a PRS transmission resource pool with the first device.

In this embodiment, the PRS and a position of the DMRS of the PSSCH may be indicated by a corresponding control signaling, and be obtained by decoding the control signaling, and the control signaling is on the same frequency band/Bandwidth Part (BWP)/carrier as the PRS and the PSSCH associated with the PRS, or on a frequency band/BWP/carrier different from that of the PRS and the PSSCH associated with the PRS.

In an embodiment, performing the resource exclusion for the resource indicated for reservation based on the measurement metrics and selecting the transmission resource from remaining available resources includes:

selecting the resource of transmitting the first PRS from remaining available candidate transmission resources; or selecting, from the remaining available candidate transmission resources, the resource of transmitting the first PRS and at least one of the following transmission resources:

a PSSCH transmission resource associated with the first PRS;

a PSCCH transmission resource associated with the first PRS;

a preamble transmission resource associated with the first PRS.

It is to be noted that "transmitting in association" means carrying an indication message corresponding to transmission of the first PRS, transmitting at the same time as the first PRS, or transmitting at a time instant satisfying a predetermined time interval, or there is a fixed association between a transmission resource and the resource of transmitting the first PRS.

Specifically, performing the resource exclusion for the resource indicated for reservation based on the measurement metrics and selecting the transmission resource from remaining available resources include at least one of following:

selecting a PRS transmission resource, or transmission resources of PRS and PSSCH from remaining available transmission resources of the PRS and the PSSCH;

selecting, from remaining available PSCCH transmission resources, a PSCCH transmission resource having a predetermined time interval with the PRS transmission resource, or with the transmission resources of the PRS and the PSSCH;

determining the PSCCH transmission resource based on the determined PRS transmission resource or the transmission resources of the PRS and the PSSCH, wherein there is a fixed association between the PRS transmission resource or the transmission resources of the PRS and the PSSCH and the PSCCH transmission resource;

selecting, from remaining available preamble transmission resources, a preamble transmission resource having a predetermined time interval with the PRS transmission resource or with the transmission resources of the PRS and the PSSCH;

determining the preamble transmission resource based on the determined transmission resources of the PRS and the PSSCH, wherein there is a fixed association between the transmission resources of the PRS and the PSSCH and the preamble transmission resources.

In an embodiment, autonomously selecting the resource of transmitting the first PRS by the first device through sensing the PRS transmission resource pool of the first device includes:

if there exists a fourth device whose distance from the first device is within a predetermined range, the time interval between the PRS transmission resource of the first device and the PRS transmission resource of the fourth device is less than a configured threshold; wherein the first device and the fourth device have the same transmission periodicity configuration.

It is to be noted that the fourth device and the first device are of the same type, for example, both are RSUs, or both are nodes with fixed positions.

Figure 3:
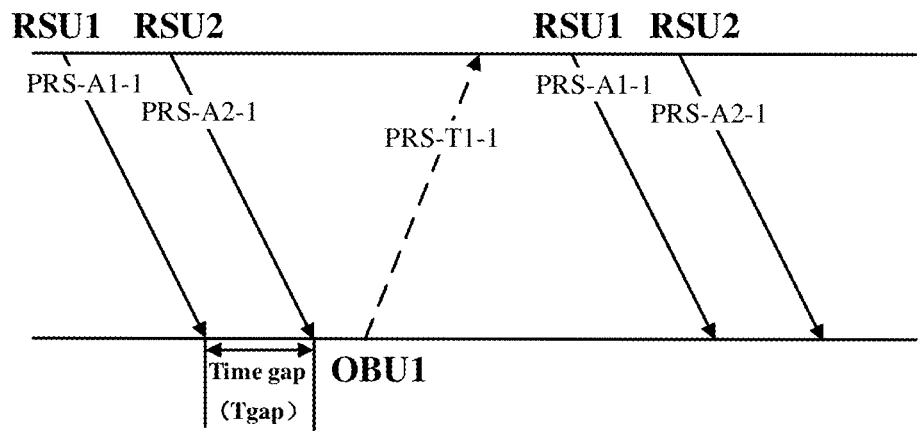
FIG. 3 shows a second schematic diagram of sending a PRS between a first device and a second device according to embodiments of the present disclosure.

Exemplarily, as shown in FIG. 3, RSU2 is the fourth device, RSU1 is the first device, and the time interval Tgap between PRS transmission resources of the both is less than a preset threshold value, such that the second device can select a second PRS transmission resource and a third PRS reception resource within an overlapped time range between time instants of periodically transmitting the respective first PRSs by the RSU1 and the RSU2, and obtain TOA measurement values (i.e., distance values) of more than two RSUs through sending a group of second PRSs and transmitting a group of third PRSs, thereby significantly reducing an overhead and a latency of the PRS transmission resources.

In an embodiment, the above method further includes:
stopping broadcasting the PRS, according to server configuration or network-side configuration; and/or
stopping broadcasting the PRS in case that the number of consecutive cycles of not receiving the PRS transmitted by the second device reaches a configured threshold value.

In this embodiment, the server configuration or the network-side configuration enables PRS broadcast transmission to be stopped when position requests are continuously not received, or the first device detects by itself and stops the PRS broadcast transmission when the number of consecutive cycles of not receiving a PRS from the second device reaches a configure threshold value, thereby avoiding an unnecessary PRS air-interface resource overhead when there is no position demand from the second device.

In an embodiment, a second resource pool for broadcasting the first PRS is orthogonal to a first resource pool in a time domain, or is orthogonal both in the time domain and in the frequency domain.

The first resource pool is a resource pool used by the second device for transmitting a PRS.

In this embodiment, by configuring the first resource pool to be orthogonal to the second resource pool, it can ensure that the first device and the second device do not transmit the PRS at the same time, and realize time division multiplexing of PRS transmission resources of the first device and the second device, which can, on one hand, avoid that the first device cannot receive the PRS of the second device and or the second device cannot receive the PRS of the first device when the first device and the second device transmit the PRS at the same time due to half-duplex, and also realize that the two types of devices can flexibly configure PRS transmission parameters according to the different requirements of transmitting PRSs and the different capabilities of the devices.

It should be noted that the information carried by first device when transmitting the PRS in the above embodiment can be a physical layer signaling, or a high-level signaling or application layer data.

Second Embodiment

Figure 4:
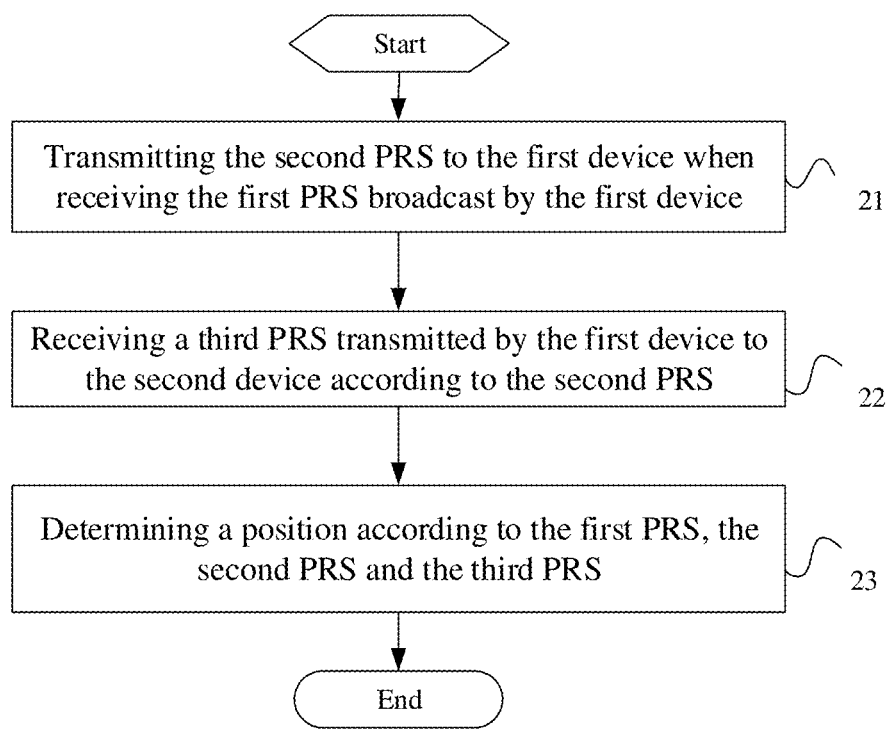
FIG. 4 shows a second schematic flowchart of the position determination method according to embodiments of the present disclosure.

As shown in FIG. 4, the second embodiment of the present disclosure provides a position determination method applied to the second device, wherein the second device may be a V2X device, including but not limited to: mobile terminals such as an On board Unit (OBU), a Vulnerable road Unit (VRU) and the like. The method specifically includes the following steps:

Step 21: transmitting the second PRS to the first device when receiving the first PRS broadcast by the first device.

The first PRS is periodically broadcast by the first device.

Further, when transmitting the second PRS to the first device, at least one of the following information is carried:
identification of the second device;
identification of the first device;
sequence information of the first PRS;
resource assignment information of transmitting the first PRS;
a resource index of transmitting the first PRS.
the number N of time domain resources between a time domain resource of receiving the first PRS and a time domain resource of transmitting the second PRS, N is a positive integer and N≥1;
a time domain resource location of transmitting a third PRS by the first device;
a time-frequency resource location of transmitting a third PRS by the first device;
periodicity of transmitting a PRS by the second device;
time-frequency assignment of a resource used to transmit the second PRS and/or information carried in association with the second PRS.

It should be noted that the sequence information of the first PRS, the resource position of transmitting the first PRS, and the resource index of transmitting the first PRS are used to implicitly indicate the identity of the first device.

Step 22: receiving a third PRS transmitted by the first device to the second device according to the second PRS;

Step 23: determining a position according to the first PRS, the second PRS and the third PRS.

In this embodiment, when a synchronization error between the first device and the second device is negligible, then the second device may perform distance measurement based on the received first PRS or the third PRS, and further determine a position of the device, or the second device may perform distance measurement based on the received second PRS, and further determine a position of the second device. In this way, the problem can be addressed that positioning the second device cannot be effectively performed in areas where the GNSS signal coverage is poor or there is no GNSS signal coverage. Moreover, through periodically broadcasting the first PRS and the carried positioning information by an anchor node (the first device) and feeding back the second PRS by the second device between two transmissions, a situation can be avoided that unicast connection establishment leads to a large positioning delay and point-to-point positioning signal interaction causes a large positioning delay, thus effectively reducing the delay. Meanwhile, there is no need for the first device to send additionally relevant timing information, one data sending process is reduced and delay reduction is equally achieved.

In an embodiment, when a synchronization error between the first device and the second device is not negligible, the method further includes:
determining first time information and second time information by the second device, wherein the first time information is first time difference between a time instant of transmitting the second PRS and a time instant of receiving the first PRS, and the second time information is second time difference between a time instant of receiving the third PRS and a time instant of transmitting the second PRS;
obtaining third time information and fourth time information transmitted by the first device, wherein the third time information is third time difference between a time instant of receiving the second PRS and a time instant of transmitting the first PRS, and the fourth time information is fourth time difference between a time instant of transmitting the third PRS and a time instant of receiving the second PRS;

wherein, the third time information is transmitted along with the third PRS, or is transmitted along with the first PRS broadcast again after the third PRS; the fourth time information is transmitted along with the first PRS broadcast again by the first device after the third PRS.

As shown in FIG. 2, the number of time domain resources between a time domain resource of receiving the first PRS and a time domain resource of transmitting the second PRS is equal to the number of time domain resources between a time domain resource of receiving the second PRS and a time domain resource of transmitting the third PRS, and is denoted as N, wherein N is a positive integer and N≥1. In FIG. 2, the first PRS is PRA-A1, the second PRS is PRS-O1-R1, and the third PRS is PRS-R1-O1.

A time domain resource granularity corresponding to the N time domain resources is an OFDM symbol.

Further, the above step 23 includes: obtaining PRS transmission time between the first device and the second device according to the first time information, the second time information, the third time information and the fourth time information, to determine a transmission distance, so as to determine the position.

Specifically, determining the position according to the first time information, the second time information, the third time information and the fourth time information includes:

determining a Time of Arrival (TOA) of signal transmission between the first device and the second device according to a formula:

$$T_{TOA} = \frac{\text{(third time information} - \text{first time information)} + \text{(second time information} - \text{fourth time information)}}{4}$$

wherein, $T_{TOA}$ is the time of arrival TOA; and determining the position according to the TOA.

Exemplarily, as shown in FIG. 2, the third time information is Tn1, the fourth time information is Tn1', the first time information is Tt1, and the second time information is Tt1'.

In this embodiment, the frequency offset of a local timer can be suppressed by the two-way RTT to achieve accurate positioning.

Figure 5:
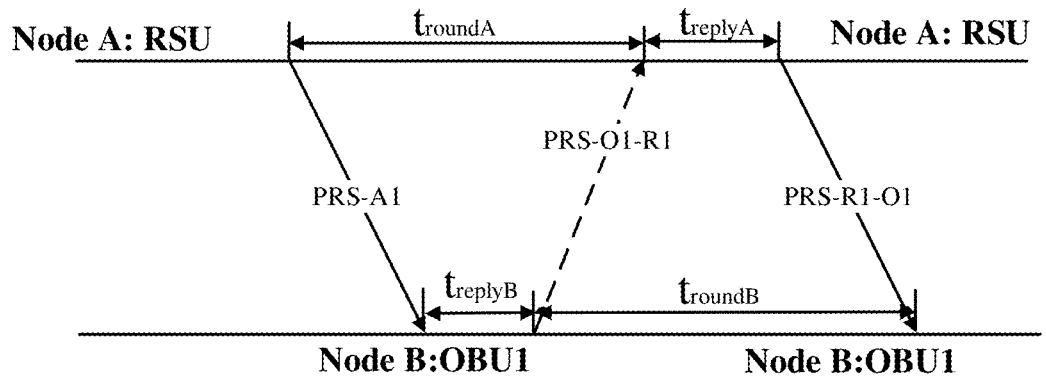
FIG. 5 shows a third schematic diagram of sending a PRS between a first device and a second device according to embodiments of the present disclosure.

In combination with FIG. 5, taking interaction and measurement processes between RSU1 and OBU1 as an example, a calculation process that the two-way RTT method can suppress the frequency offset of the local timer is described as follows.

For simplicity, RSU is denoted as a node A, OBU1 is denoted as a node B, the frequency offset of the local timer of RSU1 is denoted as $e_A$, a spectrum offset of the local timer of OBU1 is denoted as $e_B$, the actual TOA value between RSU1 and OBU1 is denoted as $t_P$, and an actual measurement value is denoted as $t_P'$.

For the two-way RTT measurement process:
an ideal condition (i.e. no frequency offset for both RSU1 and OBU1 timers):

$$4t_p = t_{roundA} - t_{replyA} + t_{roundB} - t_{replyB};$$

an actual condition:

$$4t_p' = (t_{roundA} - t_{replyA}) \times (1+e_A) + (t_{roundB} - t_{replyB}) \times (1+e_B);$$

thus, difference between an measured value and a theoretical value is:

$$t_p' - t_p =$$

$$\frac{1}{4}\{[(t_{roundA} - t_{replyA}) \times (1+e_A) + (t_{roundB} - t_{replyB}) \times (1+e_B)] - [t_{roundA} - t_{replyA} + t_{roundB} - t_{replyB}]\} = \left[\frac{1}{4}(t_{roundA} - t_{replyA}) \times e_A + (t_{roundB} - t_{replyB}) \times e_B\right];$$

assuming that:

$$t_{replyA} = t_{reply}, t_{replyB} = t_{reply} + \Delta t_{reply};$$

then, a transformation of $t_P' - t_P$ is equal to:

$$\frac{1}{4}[(t_{roundA} - t_{replyA}) \times e_A + (t_{roundB} - t_{replyB}) \times e_B] =$$

$$\frac{1}{4}[t_{roundA}e_A - t_{replyA}e_A + t_{roundB}e_B - t_{replyB}e_B] =$$

$$\frac{1}{4}[(t_{reply} + \Delta t_{reply} + 2t_p)e_A - t_{reply}e_A + (t_{reply} + 2t_p)e_B - (t_{reply} + \Delta t_{reply})e_B] =$$

$$\frac{1}{4}[t_{reply}e_A + \Delta t_{reply}e_A + 2t_pe_A - t_{reply}e_A + \Delta t_{reply}e_B + 2t_pe_B -$$

$$t_{reply}e_B - \Delta t_{reply}e_B] = \frac{1}{2}t_p(e_A + e_B) + \frac{1}{4}\Delta t_{reply}(e_A - e_B);$$

Since $e_A$ and $e_B$ are measured in units of ppm (part per million), that is, $10^{-6}$; that is:

½×$t_p(e_A+e_B)$ is far less than $t_P$, so the influence of $0.5t_p(e_A+e_B)$ is negligible, and the main error is: ¼× $\Delta t_{reply} (e_A-e_B)$.

The technical solution described in the present disclosure configures the same $t_{replyA} = t_{replyB} = N$ time domain resources, $\Delta t_{reply}$ will be 0 theoretically, the measurement error will also be zero.

Meanwhile, in practice, when the OFDM symbol granularity or the slot or the subframe defined on the sidelink is the time domain resource granularity, for the time interval between receipt of the first PRS (i.e., PRS-A1) and transmission of the second PRS (i.e., PRS-O1-R1) by the second device (OBU1) and the time interval between receipt of the second PRS from the second device by the first device (RSU1) and transmission of the third PRS (i.e., PRS-R1-O1) to the second device, since the timing deviation of the first device or the second device cannot exceed the CP, then the $\Delta t_{reply}$ is in the microsecond (us) level, and assuming that the timing deviation is not greater than ±25 ppm, then the timing error of the final TOA measurement is 0.005 ns at maximum, corresponding TOA measurement is 0.005 ns (the distance is 0.0015 m), which can significantly suppress the error.

That is, it is clear from the above analysis process that the second device (OBU/VRU), which is a target node for positioning, uses the two-way RTT method to calculate the TOA between the first device (RSU/gNB) which is the anchor node for positioning and the second device, and is able to eliminate the effect of the timing error caused by the frequency offset the local timer.

Further, it is necessary to point out that the transmission time (TOA) of the positioning signal is calculated only by the time difference (relative time) between the time instants locally recorded by the transmitting end and the receiving end, i.e., the solution of achieving positioning by the one-way RTT calculation. Since there may be inherent timing errors (the timer frequency offset) in the respective local timers at the transmitting end and the receiving end, the problem of timing errors due to the frequency offset of the local timers cannot be solved if a positioning error better than 3 meters is required, i.e., a RX-TX time difference (a time difference between receiving and transmitting is T2) measured by the terminal and a RX-TX time difference (a time difference between receiving and transmitting is T1) measured by the base station are used through an uplink-downlink hybrid approach, to calculate the round trip time (RTT) of the positioning signal transmission between the terminal and the base station, which is a one-way RTT calculation method that can only realize positioning when both sides of the transmitting end and the receiving end cannot achieve high precision time synchronization (e.g. in the nanosecond (ns) level), but cannot solve the problem of local timing error. A brief description is as follows:

For example, for the TOA measurement error caused by the timing error, the frequency offset coefficients of a transmitter timer and a receiver timer are recorded as $e_1$ and $e_2$, respectively, and then being brought into $t_{TOA}=(T_1-T_2)/2$, the corresponding distance calculation value after accounting for the timing error is $d=\{T_1-T_2-(e_1 \times T_1-e_2 \times T_2)\}/2$. Assuming that the frequency deviation tolerance of the device clock is ±1 ppm, $T_1=10$ ms, and $T_2 \approx 10$ ms, the distance error due to the frequency deviation under this condition can be up to 3 meters, and precise positioning cannot be achieved.

Note: the above example refers to the higher requirement of the local timer crystal oscillator, while in other situations, such as the IEEE 802.11 protocol, ±25 ppm is generally specified. Moreover, in this case, PRS transmissions on both the transmitting device and the receiving device need to be completed within 10 ms, which on one hand requires higher feedback processing capability, and on the other hand, also tends to cause a smaller tolerance for determining the transmitting resources, resulting in a higher probability of causing a conflict of transmitting resources.

Through the above analysis process, it can be seen that the above embodiment uses the two-way RTT for TOA calculation and measurement, can eliminate the effect of the timing error caused by the frequency offset of the local timer and achieve the precise positioning of the second device when the Vehicle-to-everything (V2X) has a high-precision positioning demand without the need for high-precision time synchronization, and can be applied to both the sidelink and the uplink and the downlink of a cellular network.

It is to be noted that during PRS-A1 to PRS-A2, if the RSU1 also receives PRS-O2-R1 from other OBUs (e.g., OBU2) as well as the feedback PRS-R1-O2, the broadcast of the first PRS also includes Tn2 and Tn2' associated with OBU2 (not shown in the figures, similar to schematic diagram of Tn1 and Tn1' corresponding to OBU1 in FIG. 2), and at least one of the following information:
  an ID of OBU2;
  resource assignment information of PRS corresponding to a record moment of Tn2;
  resource index information of PRS corresponding to a record moment of Tn2;
  association relationship of a PRS sequence with at least one of resource assignment information of PRS corresponding to a record moment of Tn2 and resource index information of PRS corresponding to a record moment of Tn2.

It can be understood that if the first PRS broadcast by the first device also includes the corresponding information of OBU2, then since OBU1 cannot be informed of time values such as Tt2 and Tt2' (not shown in the figures, similar to the schematic diagram of Tt1 and Tt1' corresponding to OBU1 in FIG. 2) of OBU2, OBU1, the trajectory of OBU2 cannot be tracked after obtaining the time instants of Tt2 and/or Tt2' unrelated to the OBU1. Similarly, RSU/gNB cannot track either the trajectory of OBU1 or the trajectory of OBU2, thus, privacy security can be ensured.

In an embodiment, before the above step 12, the method further includes: determining the resource of transmitting the second PRS by at least one of the following:
  a positioning server configuration;
  a radio resource control RRC configuration;
  a pre-configuration;
  scheduling the resource of transmitting the second PRS for the second device by the base station gNB/eNB and configuring the periodicity of transmitting the PRS;
  autonomously selecting the resource of transmitting the second PRS by the second device through sensing a PRS transmission resource pool of the second device;
  determining, according to PRS transmission periodicity of transmitting a PRS by the first device, the resource of periodically transmitting the second PRS by the second device.

In an embodiment, autonomously selecting the resource of transmitting the second PRS by the second device through sensing the PRS transmission resource pool of the second device includes:
  measuring a measurement metrics used for resource exclusion on a transmission resource in the resource pool available for PRS transmission prior to triggering transmission of a Physical Sidelink Shared Channel (PSSCH) of the PRS;
  performing a resource exclusion for a resource indicated for reservation based on the measurement metrics and selecting a transmission resource from remaining available resources, wherein, upon determining that a PRS transmission resource occupied by the device is unavailable, or upon determining that one or more of the PRS transmission resource occupied by the device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, reselecting the unavailable resource;
  when the second device receives the PRS from an adjacent first device, determining the resource of transmitting the second PRS, or determining the resource of transmitting the second PRS from candidate resources which do not periodically overlap with the PRS of the first device.

It is noted that the PRS transmission resource pool in this embodiment may be on a licensed band or an unlicensed band available for sidelink transmission.

Specifically, the measurement metrics include at least one of following:
  a Reference Signal Received Power (RSRP) of the PRS transmitted by the fifth device;
  an RSRP of a Demodulation Reference Signal (DMRS) of a PSSCH transmitted at the same time with the PRS transmitted by the fifth device;
  an RSRP of the PSCCH of a control signaling associated with the PRS transmitted by the fifth device;
  a received power of a Preamble associated with the PRS transmitted by the fifth device;
  a Received Signal Strength Indication (RSSI) of the PRS transmitted by the fifth device,
  wherein the fifth device is a device that shares a PRS transmission resource pool with the second device.

In an embodiment, performing the resource exclusion for the resource indicated for reservation based on the measurement metrics and selecting the transmission resource from remaining available resources includes:
  selecting the resource of transmitting the second PRS from remaining available PRS candidate transmission resources; or
  selecting, from the remaining available candidate transmission resources, the resource of transmitting the second PRS and at least one of the following transmission resources:
    a PSSCH transmission resource associated with the second PRS;
    a PSCCH transmission resource associated with the second PRS;
    a preamble transmission resource associated with the second PRS.

It is to be noted that "transmitting in association" means carrying an indication message corresponding to transmission of the second PRS, transmitting at the same time as the second PRS, or transmitting at a time instant satisfying a predetermined time interval, or there is a fixed association between a transmission resource and the resource of transmitting the second PRS.

In the above embodiments, the resource selection window meets the following conditions:
  both a start and an end of the resource selection window are less than T/2;
  a start of the resource selection window is greater than or equal to a first time duration; T is the periodicity of transmitting a PRS by the first device; the first time duration is equal to a second time duration, or is equal to the sum of the second time duration and a preset PRS detection time threshold and a preset PSSCH decoding time threshold,
  wherein, the second time duration is:
  a preset time threshold of preparation of PRS transmission; or
  preset time thresholds of preparation of PRS and PSSCH transmission; or
  preset time thresholds of preparation of PRS, PSSCH, and PSCCH transmission; or
  preset time thresholds of preparation of PRS and preamble transmission; or
  preset time thresholds of preparation of PRS, PSSCH and preamble transmission; or
  preset time thresholds of preparation of PRS, PSSCH, PSCCH and preamble transmission.

This embodiment ensures that all resources in the resource selection window are available by ensuring that the resource selection window meets the above conditions, and it is avoided that packets cannot be timely formed and dropped after a resource at the start of the resource selection window is used as a transmission resource due to preparation time of the device.

In an embodiment, when autonomously selecting the resource of transmitting a second PRS, the method also includes: determining a resource of receiving the third PRS; wherein, the number of time domain resources between the resource of receiving the third PRS and the resource of transmitting the second PRS is the same as the number of time domain resources between the resource of transmitting the second PRS and the resource of receiving the first PRS.

In this embodiment, when autonomously selecting the resource of transmitting the second PRS resource, the resource of receiving the third PRS is determined at the same time, and the following can be avoided: the first device cannot perform transmission of the third PRS on a transmission resource after N time domain resources occupied by another device, after the first device receives the second PRS, and if the first device abandons transmission of the third PRS, then a TOA measurement process which supports timing error suppression cannot be completed; and if the first device chooses the transmission resource on other time domain resources, it is difficult to guarantee $t_{replyA}=t_{replyB}$, and a timing error suppression effect will be significantly worsened.

In an embodiment, the first resource pool for transmitting the second PRS is orthogonal to the second resource pool in the time domain, or orthogonal to the second resource pool both in the time domain and in the frequency domain; wherein, the second resource pool is the resource pool used by the first device to transmit the PRS.

In this embodiment, by configuring the first resource pool to be orthogonal to the second resource pool, it can be ensured that the first device and the second device do not transmit PRSs at the same time, and realize the time division multiplexing of PRS transmission resources of the first device and the second device. On one hand, it can be avoided that the first device cannot receive the PRS from the second device and the second device cannot receive the PRS from the first device when the first device and the second device transmit the PRSs at the same time because of half duplex, and it can realize that two types of devices flexibly configure PRS transmission parameters according different PRS transmission requirement and/or different device capabilities.

It should be pointed out that the information carried by the second device when transmitting the PRS in the above embodiment can be a physical layer signaling, or a high-level signaling or an application layer data.

The position determination method provided by the present disclosure will be introduced below in combination with FIG. 2 by way of an example that the first device is RSU1 and the second device is OBU1.

Step 1: RSU1 side.
  1. After determining resources of transmitting the PRS or transmitting the PRS and the positioning information, periodically or semi-persistently broadcasting PRS signals PRS-A0, PRS-A1, PRS-A2 . . . by taking T as the period.
  2. When transmitting the PRS-A1, no PRS from other OBUs and VRUs have been received in the previous period. Therefore, when broadcasting the PRS, at least one of the following information is carried:
  a RSU ID;
  explicit indication in positioning information;
  a PRS resource location or a PRS index or a PRS resource ID or a PRS sequence; wherein the information of the RSU ID may be implicitly indicated by the PRS resource location or the PRS resource index or the PRS resource ID, or by further the association of the resource location with the PRS sequence;
  transmission periodicity or reservation periodicity T of PRS signals;
  time-frequency assignment of PRS signals and/or transmission resources carrying positioning information;
  RSU position information.

Step 2: OBU1 side.
Note: Multiple OBUs or VRUs receive and transmit PRSs simultaneously in coverage of the RSU1.
  1. After the OBU1 receives the PRS-A1, the OBU1 determines resources of transmitting the PRS or transmitting the PRS and the positioning information by the OBU1, and the periodicity of transmitting the PRS, and determines the number of time domain resources n1 between the resource of receiving the PRS-A1 and the resource of transmitting the PRS-O1-R1, and at least one of the following information is carried:

a OBU1 ID;

explicit indication in positioning information;

information implicitly indicating the OBU1 ID by the resource location of transmitting the PRS or the resource index or resource ID of transmitting the PRS, or by further the association of the resource location with the PRS sequence;

RSU1 ID;

explicit indication in positioning information;

information implicitly indicating the RSU ID by the resource location of transmitting the PRS or the resource index or resource ID of transmitting the PRS, or by further the association of the resource location with the PRS sequence;

the number of time domain resources to be waited from the time instant of receiving the PRS-O1-R1 by the RSU1 to the time instant of transmitting the PRS-R1-O1 (i.e., the number n1 of time domain resources between the time instant of receiving the PRS-A1 to the time instant of transmitting the PRS-O1-R1), or the time domain resource location or the time-frequency resource location of transmitting the PRS-R1-O1 by the RSU1;

transmission periodicity or reservation periodicity of PRS signals by OBU1;

time-frequency assignment of transmitting PRS signals and/or transmission resources carrying positioning information by OBU1;

time Tt1 recorded by the OBU1 from receiving the PRS-A1 to transmitting the PRS-O1-R1.

Step 3. When RSU1 receives the PRS-O1-R1 and the information transmitted along the PRS-O1-R1, the RSU1 records the time instant Tn1 from transmitting the PRS-A1 to receiving the PRS-O1-R1;

After an interval of N time domain resources, PRS-R1-O1 is transmitted to OBU1, and difference Tn1' between the time instant of receiving PRS-O1-R1 and the time instant of transmitting the PRS-R1-O1 is recorded, without carrying any information, or at least one of the following information is carried when transmitting the PRS:

RSU ID;

explicit indication in positioning information;

information implicitly indicating the RSU ID by the resource location of transmitting the PRS or the resource index or resource ID of transmitting the PRS, or by further the association of the resource location with the PRS sequence;

time-frequency assignment of transmitting PRS signals and/or transmission resources carrying positioning information;

Tn1;

OBU1 ID;

resource assignment information of PRS corresponding to the time instant of Tn1;

resource index information of PRS corresponding to the time instant of Tn1;

association between the PRS sequence and at least one of the resource location of PRS corresponding to the time instant of Tn1 and the resource index information of PRS corresponding to the time instant of Ta1–t1.

Step 4. OBU1 detects the PRS-R1-O1 after a time interval of 2N time domain resources, records the difference Tt1' from the time instant of transmitting the PRS-O1-R1 to the time instant of receiving the PRS-R1-O1. If corresponding information of PRS-R1-O1 carries Tn1, then this value is recorded.

Step 5. When RSU1 reaches the time instant of transmitting the next periodic PRS, the RSU broadcasts the PRS-A2, which carries at least one of the following information:

RSU ID;

explicit indication in positioning information;

information implicitly indicating the RSU ID by the resource location of transmitting the PRS or the resource index or resource ID of transmitting the PRS, or by further the association of the resource location with the PRS sequence;

transmission periodicity or reservation periodicity of PRS signals;

time-frequency assignment of transmitting PRS signals and/or transmission resources carrying positioning information;

Tn1;

Tn1';

resource assignment information of PRS corresponding to the time instant of Tn1;

resource index information of PRS corresponding to the time instant of Tn1;

association between the PRS sequence and at least one of the resource location of PRS corresponding to the time instant of Tn1 and the resource index information of PRS corresponding to the time instant of Tn1.

Step 6. OBU1 receives the PRS-A2, obtains the time instant value Tn1' or Tn1 and Tn1' related to OBU1, and calculates the TOA of OBU1 and RSU1:

$$t_{TOA} = \{(Tn1-Tt1)+(Tt1'-Tn1')\}/4;$$

The Tn1 corresponds to the third time information, Tn1' corresponds to the fourth time information, Tt1 corresponds to the first time information, and Tt1' corresponds to the second time information.

The following effects can be achieved by the above technical solutions:

(1) the effect of the timing error caused by the frequency offset of the local timer can be eliminated when the vehicles to everything (V2X) has a high-precision positioning demand without the need for high-precision time synchronization, and the solutions can be applied to both the sidelink and the uplink and the downlink of a cellular network.

(2) When the two-way RTT is used for the TOA measurement, and through periodically broadcasting the PRS which carries the positioning information by an anchor node and feeding back the PRS the OBU/RSU between two transmissions, a situation can be avoided that unicast connection establishment leads to a large positioning delay and point-to-point positioning signal interaction causes a large positioning delay, thus effectively reducing the delay. Meanwhile, there is no need for the RSU to transmit additionally relevant timing information, one data sending process is reduced and delay reduction is equally achieved.

(3) The PRS transmitted through broadcasting by the RSU/gNB carries a number of time values related to TOA calculation associated with the OBUs/VRUs. In case of achieving delay reduction and information interaction cost reduction, through design of interactive information, each OBU/VRU with positioning requirements can obtain effective calculation data, and it is ensured that when receiving calculation data of other OBU/VRU, tracks of other OBU/VRU cannot be traced, which ensures privacy security.

(4) In addition, for resource selection methods of RSU and OBU/VRU, it can support that Sidelink is on a dedicated spectrum or an unlicensed spectrum, RSU and OBU/VRU measure and perform resource selection on a PRS transmission resource pool, and supports OBU/VRU to realize TOA measurement of the two-way RTT with at least two RSUs through one PRS signal transmission.

Third Embodiment

Figure 6:
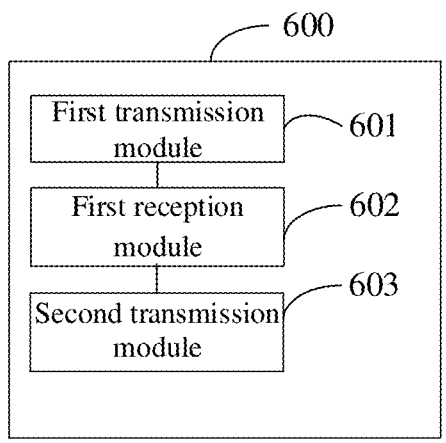
FIG. 6 shows a first block diagram of a position determination apparatus according to embodiments of the present disclosure.

As shown in FIG. 6, embodiments of the present disclosure provide a position determination apparatus 600 which is applied to a first device. The position determination apparatus 600 includes:
- a first transmission module 601 configured to periodically broadcast a first Positioning Reference Signal (PRS);
- a second reception module 602 configured to receive a second PRS fed back from the second device based on the first PRS;
- a second transmission module 603 configured to transmit a third PRS to the second device based on the second PRS;
- wherein, the second device determines a position based on the first PRS, the second PRS, and the third PRS.

Optionally, when broadcasting the first PRS, at least one of the following information is carried:
- identification of the first device;
- periodicity of transmitting the first PRS;
- time-frequency assignment of a resource for broadcasting the first PRS;
- location information of the first device.

Optionally, the apparatus 600 further includes:
- a first determination module configured to determine third time information and fourth time information;
- a time information transmission module configured to transmit the third time information and the fourth time information to the second device;
- wherein, the third time information is third time difference between a time instant of receiving the second PRS and a time instant of transmitting the first PRS;
- the fourth time information is fourth time difference between a time instant of transmitting the third PRS and a time instant of receiving the second PRS;
- wherein, the third time information and the fourth time information are used by the second device to determine the position.

Optionally, the time information transmission module includes:
- a first transmission submodule configured to when time instants of periodically transmitting the first PRS are reached, broadcast the first PRS which simultaneously carries the fourth time information or both the third time information and the fourth time information, and simultaneously carries at least one of the following:
  - identification information of the second device;
  - sequence information of the second PRS;
  - resource assignment information of transmitting the second PRS;
  - a resource index of transmitting the second PRS.

Optionally, the apparatus 600 further includes:
- a second determination module configured to determine the number N of first time domain resources between the time domain resource of receiving the first PRS by the second device and the time domain resource of transmitting the second PRS by the second device, N is a positive integer and N≥1;
- a third determination module configured to determine that the number of time domain resources between the time domain resource of receiving the second PRS and the time domain resource of transmitting the third PRS is the same as the number of the first time domain resources;
- a fourth determination module configured to determine a time domain resource of transmitting the third PRS, and determine a resource of transmitting the third PRS on the time domain resource.

Optionally, when transmitting the third PRS to the second device, at least one of the following information is carried:
- identification of the first device;
- time domain assignment of a resource for broadcasting the first PRS;
- time-frequency assignment of a resource for broadcasting the first PRS;
- first time difference between a time instant of receiving the second PRS and a time instant of transmitting the first PRS;
- identification of the second device;
- sequence information of the second PRS;
- resource assignment information of transmitting the second PRS;
- a resource index of transmitting the second PRS.

Optionally, the apparatus further includes:
- a fifth determination module configured to determine the resource of transmitting the first PRS and/or the periodicity of transmitting the first PRS by at least one of following ways:
  - a positioning server configuration;
  - a radio resource control RRC configuration;
  - a pre-configuration;
  - scheduling the resource of transmitting the PRS for the first device by the base station gNB/eNB and configuring the periodicity of transmitting the PRS;
  - autonomously selecting the resource of transmitting the first PRS by the first device through sensing a PRS transmission resource pool of the first device;
  - autonomously adjusting the periodicity of transmitting the first PRS by the first device according to a congestion level of receiving the PRS transmitted by the second device.

Optionally, the fifth determination module includes:
- a first determination submodule configured to measure a measurement metrics used for resource exclusion on a transmission resource in the resource pool available for PRS transmission prior to triggering transmission of a Physical Sidelink Shared Channel (PSSCH) of the PRS;
- a second determination submodule configured to perform a resource exclusion for a resource indicated for reservation based on the measurement metrics and select a transmission resource from remaining available resources;
- a third determination submodule configured to, upon determining that a PRS transmission resource occupied by the first device is unavailable, or upon determining that one or more of the PRS transmission resource occupied by the first device, a PSSCH transmission resource associated with the PRS transmission resource, a PSCCH transmission resource associated with the PRS transmission resource, and a preamble transmission resource associated with the PRS transmission resource are unavailable, reselect the unavailable resource.

Optionally, the measurement metrics include at least one of following:
- a Reference Signal Received Power (RSRP) of the PRS transmitted by the third device;
- an RSRP of a Demodulation Reference Signal (DMRS) of a PSSCH associated with the PRS transmitted by the third device;
- an RSRP of the PSCCH of a control signaling associated with the PRS transmitted by the third device;
- a received power of a Preamble associated with the PRS transmitted by the third device;
- a Received Signal Strength Indication (RSSI) of the PRS transmitted by the third device, wherein the third device is a device that shares a PRS transmission resource pool with the first device.

Optionally, the second determination submodule is configured to:
- select the resource of transmitting the first PRS from remaining available candidate transmission resources; or
- select, from the remaining available candidate transmission resources, the resource of transmitting the first PRS and at least one of the following transmission resources:
  - a PSSCH transmission resource associated with the first PRS;
  - a PSCCH transmission resource associated with the first PRS;
  - a preamble transmission resource associated with the first PRS.

Optionally, autonomously selecting the resource of transmitting the first PRS by the fifth determination module through sensing the PRS transmission resource pool specifically includes:
- if there exists a fourth device whose distance from the first device is within a predetermined range, the time interval between the PRS transmission resource of the first device and the PRS transmission resource of the fourth device is less than a configured threshold.

Optionally, the apparatus 600 further includes:
- a first processing module configured to stop broadcasting the PRS, according to server configuration or network-side configuration; and/or
- a second processing module configured to stop broadcasting the PRS in case that the number of consecutive cycles of not receiving the PRS transmitted by the second device reaches a configured threshold value.

Optionally, a second resource pool for broadcasting the first PRS is orthogonal to a first resource pool in a time domain, or is orthogonal to the first resource pool both in the time domain and in the frequency domain.

The first resource pool is a resource pool used by the second device for transmitting a PRS.

The third embodiment of the present disclosure corresponds to the method of the first embodiment described above, and all implementation methods in the first embodiment described above are applicable in the embodiment of the position determination apparatus 600, which also achieves the same technical effect.

Fourth Embodiment

Figure 7:
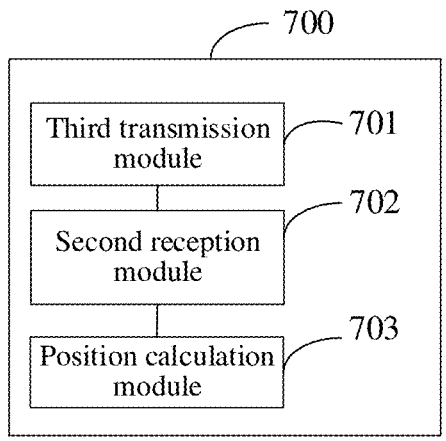
FIG. 7 shows a second block diagram of a position determination apparatus according to embodiments of the present disclosure.

As shown in FIG. 7, a position determination apparatus 700 of the embodiments of the present disclosure is applied to a second device. The apparatus 700 includes:
- a third transmission module 701 configured transmit the second PRS to the first device when receiving the first PRS broadcast by the first device;
- a second reception module 702 configured to receive a third PRS transmitted by the first device to the second device according to the second PRS;
- a position calculation module 703 configured to determine a position according to the first PRS, the second PRS and the third PRS.

Optional, the apparatus 700 further includes:
- a sixth determination module configured to determine first time information and second time information, wherein the first time information is first time difference between a time instant of transmitting the second PRS and a time instant of receiving the first PRS, and the second time information is second time difference between a time instant of receiving the third PRS and a time instant of transmitting the second PRS;
- an obtaining module configured to obtain third time information and fourth time information transmitted by the first device, wherein the third time information is third time difference between a time instant of receiving the second PRS and a time instant of transmitting the first PRS, and the fourth time information is fourth time difference between a time instant of transmitting the third PRS and a time instant of receiving the second PRS.

The above position calculation module 703 includes:
- a positioning submodule configured to determine a position according to the first time information, the second time information, the third time information and the fourth time information.

Optionally, the third time information is transmitted along with the third PRS, or is transmitted along with the first PRS broadcast again after the third PRS; the fourth time information is transmitted along with the first PRS broadcast again by the first device after the third PRS.

Optional, the number of time domain resources between a time domain resource of receiving the first PRS and a time domain resource of transmitting the second PRS is equal to the number of time domain resources between a time domain resource of receiving the second PRS and a time domain resource of transmitting the third PRS, and is denoted as N, wherein N is a positive integer and N≥1.

Optional, the positioning submodule includes:
- a first positioning unit configured to determine a Time of Arrival (TOA) of signal transmission between the first device and the second device according to a formula:

$$T_{TOA} = \frac{(\text{third time information} - \text{first time information}) + (\text{second time information} - \text{fourth time information})}{4}$$

wherein, $T_{TOA}$ is the time of arrival TOA; and
- a second positioning unit configured to determine the position according to the TOA.

Optionally, when transmitting the second PRS to the first device, at least one of the following information is carried:
- identification of the second device;
- identification of the first device;
- sequence information of the first PRS;
- resource assignment information of transmitting the first PRS;
- a resource index of transmitting the first PRS.
- the number N of time domain resources between a time domain resource of receiving the first PRS and a time domain resource of transmitting the second PRS, N is a positive integer and N≥1;

a time domain resource location of transmitting a third PRS by the first device;

a time-frequency resource location of transmitting a third PRS by the first device;

periodicity of transmitting a PRS by the second device;

time-frequency assignment of a resource used to transmit the second PRS and/or information carried in association with the second PRS.

Optionally, the above apparatus 700 further includes:

a seventh determination module configured to determine the resource of transmitting the second PRS by at least one of the following:

a positioning server configuration;

a radio resource control RRC configuration;

a pre-configuration;

scheduling the resource of transmitting the second PRS for the second device by the base station gNB/eNB and configuring the periodicity of transmitting the PRS;

autonomously selecting the resource of transmitting the second PRS by the second device through sensing a PRS transmission resource pool of the second device;

determining, according to PRS transmission periodicity of transmitting a PRS by the first device, the resource of periodically transmitting the second PRS by the second device.

Optionally, the seventh determination module includes:

a fourth determination submodule configured to measure a measurement metrics used for resource exclusion on a transmission resource in the resource pool available for PRS transmission prior to triggering transmission of a Physical Sidelink Shared Channel (PSSCH) of the PRS;

a fifth determination submodule configured to perform a resource exclusion for a resource indicated for reservation based on the measurement metrics and select a transmission resource from remaining available resources;

a sixth determination submodule configured to, upon determining that a PRS transmission resource occupied by the device is unavailable, or upon determining that one or more of the PRS transmission resource occupied by the device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, reselect the unavailable resource;

a seventh determination submodule configured to, when receiving the PRS from an adjacent first device, determine the resource of transmitting the second PRS, or determine the resource of transmitting the second PRS from candidate resources which do not periodically overlap with the PRS of the first device.

Optionally, the apparatus further includes:

an eighth determination module, configured to, when autonomously selecting the resource of transmitting a second PRS, determine a resource of receiving the third PRS;

wherein, the number of time domain resources between the resource of receiving the third PRS and the resource of transmitting the second PRS is the same as the number of time domain resources between the resource of transmitting the second PRS and the resource of receiving the first PRS.

Optionally, the measurement metrics include at least one of following:

a Reference Signal Received Power (RSRP) of the PRS transmitted by the fifth device;

an RSRP of a Demodulation Reference Signal (DMRS) of a PSSCH transmitted at the same time with the PRS transmitted by the fifth device;

an RSRP of the PSCCH of a control signaling associated with the PRS transmitted by the fifth device;

a received power of a Preamble associated with the PRS transmitted by the fifth device;

a Received Signal Strength Indication (RSSI) of the PRS transmitted by the fifth device, wherein the fifth device is a device that shares a PRS transmission resource pool with the second device.

Optionally, the fifth determination submodule is specifically configured to:

select the resource of transmitting the second PRS from remaining available PRS candidate transmission resources; or select, from the remaining available candidate transmission resources, the resource of transmitting the second PRS and at least one of the following transmission resources:

a PSSCH transmission resource associated with the second PRS;

a PSCCH transmission resource associated with the second PRS;

a preamble transmission resource associated with the second PRS.

Optionally, the resource selection window meets the following conditions:

both a start and an end of the resource selection window are less than T/2;

a start of the resource selection window is greater than or equal to a first time duration; T is the periodicity of transmitting a PRS by the first device; the first time duration is equal to a second time duration, or is equal to the sum of the second time duration and a preset PRS detection time threshold and a preset PSSCH decoding time threshold, wherein, the second time duration is:

a preset time threshold of preparation of PRS transmission; or preset time thresholds of preparation of PRS and PSSCH transmission; or preset time thresholds of preparation of PRS, PSSCH, and PSCCH transmission; or preset time thresholds of preparation of PRS and preamble transmission; or preset time thresholds of preparation of PRS, PSSCH and preamble transmission; or preset time thresholds of preparation of PRS, PSSCH, PSCCH and preamble transmission.

Optionally, the first resource pool for transmitting the second PRS is orthogonal to the second resource pool in the time domain, or orthogonal to the second resource pool both in the time domain and in the frequency domain; wherein, the second resource pool is the resource pool used by the first device to transmit the PRS.

The position determination apparatus 700 is an apparatus corresponding to the method in the second embodiment above. All implementation methods in the embodiment of the method above are applicable to the embodiment of the position determination apparatus and can achieve the same technical effect.

Fifth Embodiment

Figure 8:
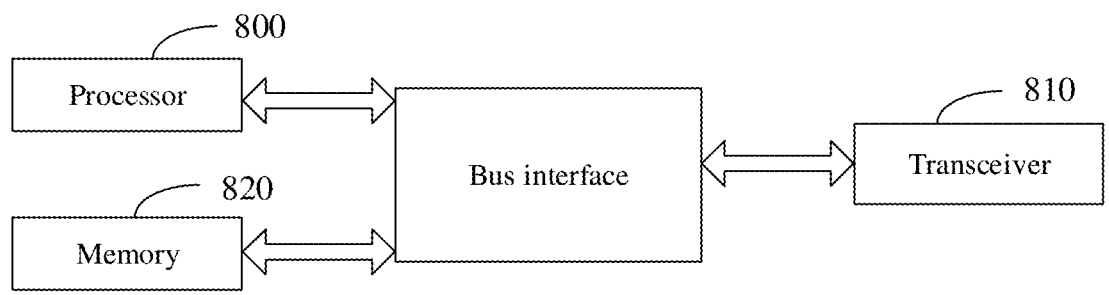
FIG. 8 shows a first block diagram of a structure of a V2X device according to embodiments of the present disclosure.

To better achieve the above purposes, as shown in FIG. 8, the fifth embodiment of the present disclosure further provides a V2X device, which is the first device. The V2X device includes: a processor 800; and a memory 820 connected to the processor 800 through a bus interface. The memory 820 is configured to store programs and data used by the processor 800 when performing operations. The processor 800 calls and executes the programs and data stored in the memory 820. The transceiver 810 is connected to the bus interface for receiving and sending data under the control of the processor 800. The processor 800 is configured to read programs in the memory 820.

Specifically, the transceiver 810 is configured for:
periodically broadcasting a first Positioning Reference Signal (PRS);
receiving a second PRS fed back from the second device based on the first PRS;
transmitting a third PRS to the second device based on the second PRS;
wherein, the second device determines a position based on the first PRS, the second PRS, and the third PRS.

In FIG. 8, a bus architecture may include any number of interconnected buses and bridges, specifically various circuits such as one or more processors represented by the processor 800 and a memory represented by the memory 820 are linked together. The bus architecture may also link together various other circuits such as peripheral devices, regulators, and power management circuits, all of which are well known in the art, and therefore, will not be further described in the embodiments of the present disclosure. A bus interface provides an interface. The transceiver 810 may be a number of elements, including a transmitter and a receiver, for providing means for communicating with various other devices over a transmission medium. The processor 800 is responsible for managing the bus architecture and general processing, the processor 820 may store data used when the processor 800 performs an operation.

Optionally, when broadcasting the first PRS by the transceiver 810, at least one of the following information is carried:
identification of the first device;
periodicity of transmitting the first PRS;
time-frequency assignment of a resource for broadcasting the first PRS;
location information of the first device.

Optionally, the processor 800 is configured to determine third time information and fourth time information; the transceiver 810 is configured to transmit the third time information and the fourth time information to the second device;
wherein, the third time information is third time difference between a time instant of receiving the second PRS and a time instant of transmitting the first PRS; the fourth time information is fourth time difference between a time instant of transmitting the third PRS and a time instant of receiving the second PRS; wherein, the third time information and the fourth time information are used by the second device to determine the position.

Optionally, when time instants of periodically transmitting the first PRS are reached, the transceiver 810 is configured for broadcasting the first PRS which simultaneously carries the fourth time information or both the third time information and the fourth time information, and simultaneously carries at least one of the following:
identification information of the second device;
sequence information of the second PRS;
resource assignment information of transmitting the second PRS;
a resource index of transmitting the second PRS.

Optionally, the processor 800 is configured for:
determining the number N of first time domain resources between the time domain resource of receiving the first PRS by the second device and the time domain resource of transmitting the second PRS by the second device, N is a positive integer and N≥1;
determining that the number of time domain resources between the time domain resource of receiving the second PRS and the time domain resource of transmitting the third PRS is the same as the number of the first time domain resources;
determining a time domain resource of transmitting the third PRS, and determining a resource of transmitting the third PRS on the time domain resource.

Optionally, when transmitting the third PRS to the second device by the transceiver 810, at least one of the following information is carried:
identification of the first device;
time domain assignment of a resource for broadcasting the first PRS;
time-frequency assignment of a resource for broadcasting the first PRS;
first time difference between a time instant of receiving the second PRS and a time instant of transmitting the first PRS;
identification of the second device;
sequence information of the second PRS;
resource assignment information of transmitting the second PRS;
a resource index of transmitting the second PRS.

Optionally, the processor 800 determines the resource of transmitting the first PRS and/or the periodicity of transmitting the first PRS by at least one of following ways:
a positioning server configuration;
a radio resource control RRC configuration;
a pre-configuration;
scheduling the resource of transmitting the PRS for the first device by the base station gNB/eNB and configuring the periodicity of transmitting the PRS;
autonomously selecting the resource of transmitting the first PRS by the first device through sensing a PRS transmission resource pool of the first device;
autonomously adjusting the periodicity of transmitting the first PRS by the first device according to a congestion level of receiving the PRS transmitted by the second device.

Optionally, in case that the first device operates on a sidelink, autonomously selecting the resource of transmitting the first PRS by the first device by the processor 800 through sensing the PRS transmission resource pool of the first device, specifically includes:
measuring a measurement metrics used for resource exclusion on a transmission resource in the resource pool available for PRS transmission prior to triggering transmission of a Physical Sidelink Shared Channel (PSSCH) of the PRS;
performing a resource exclusion for a resource indicated for reservation based on the measurement metrics and selecting a transmission resource from remaining available resources;
wherein, upon determining that a PRS transmission resource occupied by the first device is unavailable, or upon determining that one or more of the PRS transmission resource occupied by the first device, a PSSCH transmission resource associated with the PRS transmission resource, a PSCCH transmission resource associated with the PRS transmission resource, and a preamble transmission resource associated with the PRS transmission resource are unavailable, the unavailable resource is reselected.

Optionally, the measurement metrics include at least one of following:
  a Reference Signal Received Power (RSRP) of the PRS transmitted by the third device;
  an RSRP of a Demodulation Reference Signal (DMRS) of a PSSCH associated with the PRS transmitted by the third device;
  an RSRP of the PSCCH of a control signaling associated with the PRS transmitted by the third device;
  a received power of a Preamble associated with the PRS transmitted by the third device;
  a Received Signal Strength Indication (RSSI) of the PRS transmitted by the third device,
  wherein the third device is a device that shares a PRS transmission resource pool with the first device.

Optionally, performing the resource exclusion for the resource indicated for reservation based on the measurement metrics and selecting the transmission resource from remaining available resources by the processor 800 includes:
  selecting the resource of transmitting the first PRS from remaining available candidate transmission resources; or
  selecting, from the remaining available candidate transmission resources, the resource of transmitting the first PRS and at least one of the following transmission resources:
    a PSSCH transmission resource associated with the first PRS;
    a PSCCH transmission resource associated with the first PRS;
    a preamble transmission resource associated with the first PRS.

Optionally, autonomously selecting the resource of transmitting the first PRS by the processor 800 through sensing the PRS transmission resource pool specifically includes:
  if there exists a fourth device whose distance from the first device is within a predetermined range, the time interval between the PRS transmission resource of the first device and the PRS transmission resource of the fourth device is less than a configured threshold.

Optionally, the processor 800 is further configured for:
  stopping broadcasting the PRS, according to server configuration or network-side configuration; and/or
  stopping broadcasting the PRS in case that the number of consecutive cycles of not receiving the PRS transmitted by the second device reaches a configured threshold value.

Optionally, a second resource pool for broadcasting the first PRS is orthogonal to a first resource pool in a time domain, or is orthogonal to the first resource pool both in the time domain and in the frequency domain.

The first resource pool is a resource pool used by the second device for transmitting a PRS.

By using the V2X device 800 provided in the present disclosure, when a synchronization error between the first device and the second device is negligible, then the second device may perform distance measurement based on the received first PRS or the third PRS, and further determine a position of the device, or the first device may perform distance measurement based on the received second PRS, and further determine a position of the second device. In this way, the problem can be addressed that positioning the second device cannot be effectively performed in areas where the GNSS signal coverage is poor or there is no GNSS signal coverage. Moreover, through periodically broadcasting the first PRS and the carried positioning information by an anchor node (the first device) and feeding back the second PRS by the second device between two transmissions, a situation can be avoided that unicast connection establishment leads to a large positioning delay and point-to-point positioning signal interaction causes a large positioning delay, thus effectively reducing the delay. Meanwhile, there is no need for the first device to send additionally relevant timing information, one data sending process is reduced and delay reduction is equally achieved.

A person skilled in the art may understand that all or some of the steps to achieve the above embodiment may be accomplished by hardware, or by relevant hardware instructed by a computer program, the computer program includes instructions to perform some or all of the steps of the above method; and the computer program may be stored in a readable storage medium, the storage medium may be any form of storage medium.

Sixth Embodiment

Figure 9:
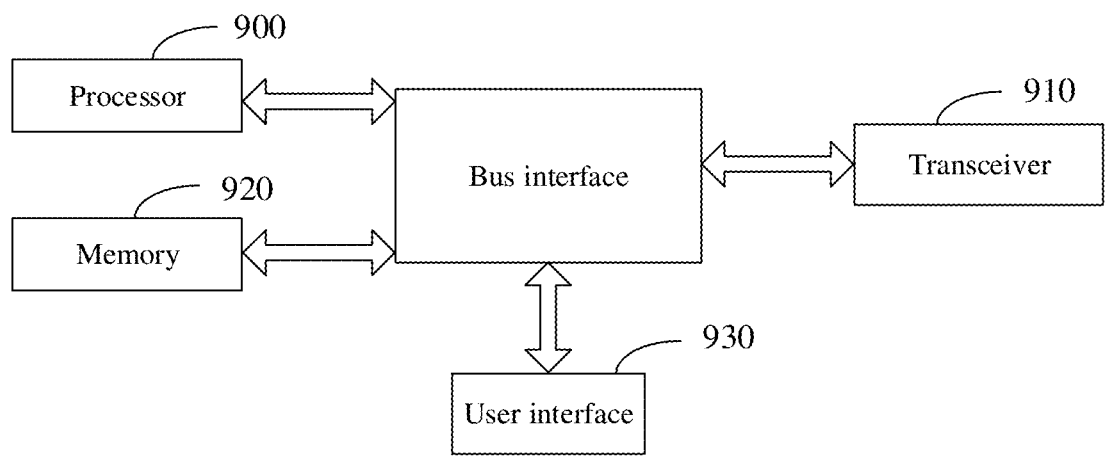
FIG. 9 shows a second block diagram of a structure of a V2X device according to embodiments of the present disclosure.

To better achieve the above purposes, as shown in FIG. 9, the sixth embodiment of the present disclosure also provides a V2X device. The V2X device is a second device. The second device includes: a processor 900; and a memory 920 connected to the processor 900 through a bus interface. The memory 920 is configured to store programs and data used by the processor 900 when performing operations. The processor 900 calls and executes the programs and data stored in the memory 920. The transceiver 910 is connected to the bus interface for receiving and sending data under the control of the processor 900. The processor 900 is configured to read programs in the memory 920.

Specifically, the transceiver 910 is configured for transmitting the second PRS to the first device when receiving the first PRS broadcast by the first device; and receiving a third PRS transmitted by the first device to the second device according to the second PRS. The processor 900 is further configured for determining a position according to the first PRS, the second PRS and the third PRS.

In FIG. 9, a bus architecture may include any number of interconnected buses and bridges, specifically various circuits such as one or more processors represented by the processor 900 and a memory represented by the memory 920 are linked together. The bus architecture may also link together various other circuits such as peripheral devices, voltage regulators, and power management circuits, all of which are well known in the art, and therefore, will not be further described in the embodiments of the present disclosure. A bus interface provides an interface. The transceiver 910 may be a number of elements, including a transmitter and a receiver, for providing means for communicating with various other devices over a transmission medium. A user interface 930 for different user terminals may also be an interface that may externally or internally be connected to a necessary device, the connected device includes, but is not limited to, a keypad, a display, a speaker, a microphone, a joystick and the like. The processor 900 is responsible for managing the bus architecture and general processing, the processor 920 may store data used when the processor 900 performs an operation.

Optional, the processor 900 is further configured for:

determining first time information and second time information, wherein the first time information is first time difference between a time instant of transmitting the second PRS and a time instant of receiving the first PRS, and the second time information is second time difference between a time instant of receiving the third PRS and a time instant of transmitting the second PRS;

obtaining third time information and fourth time information transmitted by the first device, wherein the third time information is third time difference between a time instant of receiving the second PRS and a time instant of transmitting the first PRS, and the fourth time information is fourth time difference between a time instant of transmitting the third PRS and a time instant of receiving the second PRS; and determining a position according to the first time information, the second time information, the third time information and the fourth time information.

Optionally, the third time information is transmitted along with the third PRS transmitted by the first device, or is transmitted along with the first PRS broadcast again after the third PRS; the fourth time information is transmitted along with the first PRS broadcast again by the first device after the third PRS.

Optional, the number of time domain resources between a time domain resource of receiving the first PRS and a time domain resource of transmitting the second PRS is equal to the number of time domain resources between a time domain resource of receiving the second PRS and a time domain resource of transmitting the third PRS, and is denoted as N, wherein N is a positive integer and N≥1.

Optional, determining the position according to the first time information, the second time information, the third time information and the fourth time information by the processor 900 includes:

determining a Time of Arrival (TOA) of signal transmission between the first device and the second device according to a formula:

$$T_{TOA} = \frac{(\text{third time information} - \text{first time information}) + (\text{second time information} - \text{fourth time information})}{4}$$

wherein, $T_{TOA}$ is the time of arrival TOA; and determining the position according to the TOA.

Optionally, when transmitting the second PRS to the first device by the transceiver 910, at least one of the following information is carried:

identification of the second device;
identification of the first device;
sequence information of the first PRS;
resource assignment information of transmitting the first PRS;
a resource index of transmitting the first PRS.
the number N of time domain resources between a time domain resource of receiving the first PRS and a time domain resource of transmitting the second PRS, N is a positive integer and N≥1;
a time domain resource location of transmitting a third PRS by the first device;
a time-frequency resource location of transmitting a third PRS by the first device;
periodicity of transmitting a PRS by the second device;
time-frequency assignment of a resource used to transmit the second PRS and/or information carried in association with the second PRS.

Optionally, before transmitting the second PRS to the first device by the processor 900, the processor 900 is further configured for:

determining the resource of transmitting the second PRS by at least one of the following:

a positioning server configuration;
a radio resource control RRC configuration;
a pre-configuration;
scheduling the resource of transmitting the second PRS for the second device by the base station gNB/eNB and configuring the periodicity of transmitting the PRS;
autonomously selecting the resource of transmitting the second PRS by the second device through sensing a PRS transmission resource pool of the second device;
determining, according to PRS transmission periodicity of transmitting a PRS by the first device, the resource of periodically transmitting the second PRS by the second device.

Optionally, autonomously selecting the resource of transmitting the second PRS by the processor 900 through sensing the PRS transmission resource pool of the second device specifically includes:

measuring a measurement metrics used for resource exclusion on a transmission resource in the resource pool available for PRS transmission prior to triggering transmission of a Physical Sidelink Shared Channel (PSSCH) of the PRS;
performing a resource exclusion for a resource indicated for reservation based on the measurement metrics and selecting a transmission resource from remaining available resources;
wherein, upon determining that a PRS transmission resource occupied by the device is unavailable, or upon determining that one or more of the PRS transmission resource occupied by the device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, the unavailable resource is reselected;
when receiving the PRS from an adjacent first device by the second device, determining the resource of transmitting the second PRS, or determining the resource of transmitting the second PRS from candidate resources which do not periodically overlap with the PRS of the first device.

Optionally, when the processor autonomously selecting the resource of transmitting the second PRS, the processor is further configured for:

determining a resource of receiving the third PRS;
wherein, the number of time domain resources between the resource of receiving the third PRS and the resource of transmitting the second PRS is the same as the number of time domain resources between the resource of transmitting the second PRS and the resource of receiving the first PRS.

Optionally, the measurement metrics include at least one of following:

a Reference Signal Received Power (RSRP) of the PRS transmitted by the fifth device;

an RSRP of a Demodulation Reference Signal (DMRS) of a PSSCH transmitted at the same time with the PRS transmitted by the fifth device;

an RSRP of the PSCCH of a control signaling associated with the PRS transmitted by the fifth device;

a received power of a Preamble associated with the PRS transmitted by the fifth device;

a Received Signal Strength Indication (RSSI) of the PRS transmitted by the fifth device, wherein the fifth device is a device that shares a PRS transmission resource pool with the second device.

Optionally, performing the resource exclusion for the resource indicated for reservation based on the measurement metrics and selecting the transmission resource from remaining available resources by the processor 900 includes:

selecting the resource of transmitting the second PRS from remaining available PRS candidate transmission resources; or selecting, from the remaining available candidate transmission resources, the resource of transmitting the second PRS and at least one of the following transmission resources:
  a PSSCH transmission resource associated with the second PRS;
  a PSCCH transmission resource associated with the second PRS;
  a preamble transmission resource associated with the second PRS.

Optionally, the resource selection window meets the following conditions:

both a start and an end of the resource selection window are less than T/2;

a start of the resource selection window is greater than or equal to a first time duration; T is the periodicity of transmitting a PRS by the first device; the first time duration is equal to a second time duration, or is equal to the sum of the second time duration and a preset PRS detection time threshold and a preset PSSCH decoding time threshold, wherein, the second time duration is:

a preset time threshold of preparation of PRS transmission; or preset time thresholds of preparation of PRS and PSSCH transmission; or preset time thresholds of preparation of PRS, PSSCH, and PSCCH transmission; or preset time thresholds of preparation of PRS and preamble transmission; or preset time thresholds of preparation of PRS, PSSCH and preamble transmission; or preset time thresholds of preparation of PRS, PSSCH, PSCCH and preamble transmission.

Optionally, the first resource pool for transmitting the second PRS is orthogonal to the second resource pool in the time domain, or orthogonal to the second resource pool both in the time domain and in the frequency domain; wherein, the second resource pool is the resource pool used by the first device to transmit the PRS.

By using the V2X device 900 provided in the present disclosure, when a synchronization error between the first device and the second device is negligible, then the second device may perform distance measurement based on the received first PRS or the third PRS, and further determine a position of the device, or the first device may perform distance measurement based on the received second PRS, and further determine a position of the second device. In this way, the problem can be addressed that positioning the second device cannot be effectively performed in areas where the GNSS signal coverage is poor or there is no GNSS signal coverage. Moreover, through periodically broadcasting the first PRS and the carried positioning information by an anchor node (the first device) and feeding back the second PRS by the second device between two transmissions, a situation can be avoided that unicast connection establishment leads to a large positioning delay and point-to-point positioning signal interaction causes a large positioning delay, thus effectively reducing the delay. Meanwhile, there is no need for the first device to send additionally relevant timing information, one data sending process is reduced and delay reduction is equally achieved.

A person skilled in the art may understand that all or some of the steps to achieve the above embodiment may be accomplished by hardware, or by relevant hardware instructed by a computer program, the computer program includes instructions to perform some or all of the steps of the above method; and the computer program may be stored in a readable storage medium, the storage medium may be any form of storage medium.

Further, specific embodiments of the present disclosure provide a computer readable storage medium on which a computer program is stored. When the program is executed by a processor, the processor implements the steps of the method in the first embodiment or in the second embodiment described above, and the same technical effect can be achieved. In order to avoid repetition, detailed description will not be repeated herein.

Furthermore, it is to be noted that in the apparatus and the method of the present disclosure, it is clear that components or steps can be decomposed and/or recombined. These decompositions and/or recombinations should be considered as equivalent embodiments of the present disclosure. Moreover, steps for performing the series of processing described above may be performed in a natural chronological order as described, but need not necessarily be performed in the chronological order, and certain steps may be performed in parallel or independently of each other. It is understood by those of ordinary skills in the art that all or any of the steps or components of the methods and the apparatuses of the present disclosure can be implemented in hardware, firmware, software, or a combination thereof, in any computing device (including processors, storage media, etc.) or in a network of computing devices, as can be achieved by those of ordinary skills in the art using their basic programming skills after reading the description of the present disclosure. This can be achieved by those of ordinary skill in the art using their basic programming skills after reading the description of the present disclosure.

Thus, the purpose of the present disclosure may also be achieved by running a program or a set of programs on any computing device. The computing device may be a commonly known generic device. Thus, the purpose of the present disclosure may also be achieved by simply providing a program product containing program codes that implement the method or the apparatus. That is, such a program product also constitutes the present disclosure, and a storage medium on which such a program product is stored also constitutes the present disclosure. Obviously, the storage medium may be any publicly known storage medium or any storage medium to be developed in the future. It is also noted that in the apparatus and the method of the present disclosure, it is apparent that the components or the steps can be decomposed and/or recombined. These decompositions and/or recombinations should be considered as equivalent solutions of the present disclosure. Moreover, the steps for performing the series of processes described above may be performed in a natural chronological order as described, but need not necessarily be performed in the chronological order. Certain steps may be performed in parallel or independently of each other.

It should be noted that division of the above modules is understood to be a logical functional division only, and during actual implementation, the modules can be fully or partially integrated into a physical entity or physically separated. And these modules can all be implemented in the form of software invoking processing elements; or can all be implemented in the form of hardware, or can be partially implemented in the form of software invoking the processing elements and partially be implemented in the form of hardware. For example, the determination module can be a separately established processing element or can be integrated in one of the chips of the above-mentioned device for implementation. In addition, the modules can also be stored in the memory of the above-mentioned device in the form of program codes, which are called by one of the processing elements of the above-mentioned device and perform the functions of the above-mentioned determination module. Other modules are implemented in a similar way. Furthermore, all or some of these modules can be integrated together or can be implemented independently. The processing element described here can be an integrated circuit with signal processing capabilities. In the implementation, the individual steps of the method described above or the individual modules above may be accomplished by integrated logic circuits in hardware in the processor element or by instructions in the form of software.

For example, individual modules, units, subunits, or submodules may be one or more integrated circuits configured to implement the above method, e.g., one or more Application Specific Integrated Circuits (ASICs), or, one or more microprocessors (digital signal processors (DSP)), or, one or more Field Programmable Gate Arrays (FPGA), etc. Further, when one of the above modules is implemented in the form of a processing element executing the program codes, the processing element may be a general purpose processor, such as a Central Processing Unit (CPU) or other processor that can call the program codes. Further, these modules may be integrated together and implemented as a system-on-a-chip (SOC).

Such terms as "first", "second", etc. in the specification and claims of the present disclosure are used to distinguish similar objects and need not be used to describe a particular order or sequence. It should be understood that the terms used in this way may be interchanged, where appropriate, so that the embodiments of the present disclosure described herein are implemented in an order other than those illustrated or described herein, for example. In addition, the terms "includes" and "has", and any variations thereof, are intended to cover non-exclusive inclusion, e.g., a process, a method, a system, a product, or an apparatus including a series of steps or units need not be limited to those steps or units that are clearly listed, but may include those that are not clearly listed, or include other steps or units not clearly listed or inherent to those processes, methods, products, or devices. In addition, the specification and the claims use "and/or" to denote at least one of the connected objects, e.g., A and/or B and/or C, to denote seven cases including A alone, B alone, C alone, and A and B both present, B and C both present, A and C both present, and A, B, and C all present. Similarly, the use of "at least one of A and B" in this specification and in the claims is to be understood as "A alone, B alone, or A and B both present".

The foregoing describes optional embodiments of the present disclosure, and it should be noted that for a person of ordinary skill in the art, a number of improvements and embellishments can be made without departing from the principles described in the present disclosure, and these improvements and embellishments should also be considered to be within the protection scope of the present disclosure.

What is claimed is:

1. A position determination method performed by a first device, comprising:
   periodically broadcasting a first Positioning Reference Signal (PRS);
   receiving a second PRS fed back according to the first PRS by a second device;
   transmitting a third PRS to the second device according to the second PRS;
   wherein, the second device determines a position based on the first PRS, the second PRS, and the third PRS;
   wherein, after transmitting the third PRS to the second device according to the second PRS, the method further comprises:
   determining third time information and fourth time information;
   transmitting the third time information and the fourth time information to the second device;
   wherein, the third time information is third time difference between a time instant of receiving the second PRS and a time instant of transmitting the first PRS; the fourth time information is fourth time difference between a time instant of transmitting the third PRS and a time instant of receiving the second PRS;
   wherein, the third time information and the fourth time information are used by the second device to determine the position;
   wherein transmitting the third time information and the fourth time information to the second device comprises:
   when time instants of periodically transmitting the first PRS are reached, broadcasting the first PRS which simultaneously carries the fourth time information or both the third time information and the fourth time information, and simultaneously carries at least one of the following:
   identification information of the second device;
   sequence information of the second PRS;
   resource assignment information of transmitting the second PRS;
   a resource index of transmitting the second PRS.

2. The position determination method according to claim 1, wherein when broadcasting the first PRS, at least one of following information is carried:
   identification of the first device;
   periodicity of transmitting the first PRS;
   time-frequency assignment of a resource for broadcasting the first PRS;
   location information of the first device.

3. The position determination method according to claim 1, wherein when transmitting the third PRS to the second device, at least one of following information is carried:
   identification of the first device;
   time domain assignment of a resource for broadcasting the first PRS; time-frequency assignment of a resource for broadcasting the first PRS;
   first time difference between a time instant of receiving the second PRS and a time instant of transmitting the first PRS;

identification of the second device;
sequence information of the second PRS;
resource assignment information of transmitting the second PRS;
a resource index of transmitting the second PRS.

4. The position determination method according to claim 1, wherein before broadcasting the first PRS, the method further comprises:
determining a resource of transmitting the first PRS and/or periodicity of transmitting the first PRS by at least one of following ways:
a positioning server configuration;
a radio resource control RRC configuration;
a pre-configuration;
scheduling the resource of transmitting the PRS for the first device by a base station gNB/eNB and configuring the periodicity of transmitting the PRS;
autonomously selecting the resource of transmitting the first PRS by the first device through sensing a PRS transmission resource pool of the first device;
autonomously adjusting the periodicity of transmitting the first PRS by the first device according to a congestion level of receiving the PRS transmitted by the second device.

5. The position determination method according to claim 4, wherein in a case that the first device operates in a sidelink, autonomously selecting the resource of transmitting the first PRS by the first device through sensing the PRS transmission resource pool of the first device comprises:
measuring a measurement metrics used for resource exclusion on a transmission resource in a resource pool available for PRS transmission, prior to triggering transmission of a Physical Sidelink Shared Channel (PSSCH) of a PRS;
performing resource exclusion for a resource indicated for reservation based on the measurement metrics and selecting a transmission resource from remaining available resources;
when determining that a PRS transmission resource occupied by the first device is unavailable, or when determining that one or more of the PRS transmission resource occupied by the first device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, reselecting the resource that is unavailable.

6. The position determination method according to claim 5, wherein the measurement metrics comprise at least one of following:
a Reference Signal Received Power (RSRP) of the PRS transmitted by the third device;
an RSRP of a Demodulation Reference Signal (DMRS) of a PSSCH associated with the PRS transmitted by the third device;
an RSRP of the PSCCH of a control signaling associated with the PRS transmitted by the third device;
a received power of a Preamble associated with the PRS transmitted by the third device;
a Received Signal Strength Indication (RSSI) of the PRS transmitted by the third device,
wherein the third device is a device that shares a PRS transmission resource pool with the first device.

7. The position determination method according to claim 5, wherein performing the resource exclusion for the resource indicated for reservation based on the measurement metrics and selecting the transmission resource from remaining available resources comprises:
selecting the resource of transmitting the first PRS from remaining available candidate transmission resources; or
selecting, from the remaining available candidate transmission resources, the resource of transmitting the first PRS and at least one of following transmission resources: a PSSCH transmission resource associated with the first PRS; a PSCCH transmission resource associated with the first PRS; a preamble transmission resource associated with the first PRS.

8. The position determination method according to claim 1, further comprising:
stopping broadcasting the PRS, according to a server configuration or a network-side configuration; and/or
stopping broadcasting the PRS in case that the number of consecutive cycles of not receiving the PRS transmitted by the second device reaches a configured threshold value.

9. A position determination method performed by a second device, comprising:
transmitting a second Positioning Reference Signal (PRS) to a first device when receiving a first PRS broadcast by the first device;
receiving a third PRS transmitted by the first device to the second device according to the second PRS;
determining a position according to the first PRS, the second PRS and the third PRS,
wherein the method further comprises:
determining first time information and second time information, wherein the first time information is first time difference between a time instant of transmitting the second PRS and a time instant of receiving the first PRS, and the second time information is second time difference between a time instant of receiving the third PRS and a time instant of transmitting the second PRS;
obtaining third time information and fourth time information transmitted by the first device,
wherein the third time information is third time difference between a time instant of receiving the second PRS and a time instant of transmitting the first PRS, and the fourth time information is fourth time difference between a time instant of transmitting the third PRS and a time instant of receiving the second PRS;
wherein, determining the position according to the first PRS, the second PRS and the third PRS comprises determining a position according to the first time information, the second time information, the third time information and the fourth time information;
wherein when transmitting the second PRS to the first device, at least one of following information is carried:
identification of the second device;
identification of the first device;
sequence information of the first PRS;
resource assignment information of transmitting the first PRS;
a resource index of transmitting the first PRS;
the number N of time domain resources between a time domain resource of receiving the first PRS and a time domain resource of transmitting the second PRS, wherein N is a positive integer and N≥1;
a time domain resource location of transmitting a third PRS by the first device;
a time-frequency resource location of transmitting a third PRS by the first device;

periodicity of transmitting the second PRS by the second device;

time-frequency assignment of a resource used to transmit the second PRS and/or information carried in association with the second PRS;

wherein the third time information is transmitted along with the third PRS transmitted by the first device, or is transmitted along with the first PRS broadcast again after the third PRS;

the fourth time information is transmitted along with the first PRS broadcast again by the first device after the third PRS.

10. The position determination method according to claim 9, wherein before transmitting the second PRS to the first device, the method further comprises:
determining the resource of transmitting the second PRS by at least one of the following:
a positioning server configuration;
a radio resource control RRC configuration;
a pre-configuration;
scheduling the resource of transmitting the second PRS for the second device by a base station gNB/eNB and configuring the periodicity of transmitting the second PRS;
autonomously selecting the resource of transmitting the second PRS by the second device through sensing a PRS transmission resource pool of the second device;
determining, according to PRS transmission periodicity of transmitting a PRS by the first device, the resource of periodically transmitting the second PRS by the second device.

11. The position determination method according to claim 10, wherein autonomously selecting the resource of transmitting the second PRS by the second device through sensing the PRS transmission resource pool of the second device comprises:
measuring a measurement metrics used for resource exclusion on a transmission resource in a resource pool available for PRS transmission, prior to triggering transmission of a Physical Sidelink Shared Channel (PSSCH) of a PRS;
performing resource exclusion for a resource indicated for reservation based on the measurement metrics and selecting a transmission resource from remaining available resources;
when determining that a PRS transmission resource occupied by the second device is unavailable, or when determining that one or more of the PRS transmission resource occupied by the second device, a PSSCH transmission resource associated with the PRS transmission resource, a Physical Sidelink Control Channel (PSCCH) transmission resource associated with the PRS transmission resource, and a preamble transmission resource associated with the PRS transmission resource are unavailable, reselecting the resource that is unavailable;
when receiving the PRS from the adjacent first device, determining the resource of transmitting the second PRS, or determining the resource of transmitting the second PRS from candidate resources which do not periodically overlap with the PRS of the first device.

12. The position determination method according to claim 11, wherein the measurement metrics comprises at least one of following:
a Reference Signal Received Power (RSRP) of a PRS transmitted by a fifth device;
an RSRP of a Demodulation Reference Signal (DMRS) of a PSSCH transmitted simultaneously with the PRS transmitted by the fifth device;
an RSRP of a PSCCH of a control signaling associated with the PRS transmitted by the fifth device;
a received power of a preamble associated with the PRS transmitted by the fifth device;
a Received Signal Strength Indication (RSSI) of the PRS transmitted by the fifth device,
wherein the fifth device is a device that shares a PRS transmission resource pool with the second device.

13. The position determination method according to claim 11, wherein performing the resource exclusion for the resource indicated for reservation based on the measurement metrics and selecting the transmission resource from the remaining available resources comprises:
selecting the resource of transmitting the second PRS from remaining available PRS candidate transmission resources; or
selecting, from the remaining available candidate transmission resources, the resource of transmitting the second PRS and at least one of following transmission resources:
a PSSCH transmission resource associated with the second PRS;
a PSCCH transmission resource associated with the second PRS;
a preamble transmission resource associated with the second PRS.

14. The position determination method according to claim 13, wherein the resource selection window satisfies following conditions:
both a start and an end of the resource selection window are less than T/2;
a start of the resource selection window is greater than or equal to a first time duration; T is periodicity of transmitting a PRS by the first device; the first time duration is equal to a second time duration, or is equal to a sum of the second time duration and a preset PRS detection time threshold and a preset PSSCH decoding time threshold,
wherein, the second time duration is:
a preset time threshold of preparation of PRS transmission; or
preset time thresholds of preparation of PRS and PSSCH transmission; or
preset time thresholds of preparation of PRS, PSSCH, and PSCCH transmission; or
preset time thresholds of preparation of PRS and preamble transmission; or
preset time thresholds of preparation of PRS, PSSCH and preamble transmission; or
preset time thresholds of preparation of PRS, PSSCH, PSCCH and preamble transmission.

15. A V2X device, the V2X device being a first device, comprising:
a transceiver, a memory, a processor and a computer program stored on the memory and executable by the processor, wherein when the processor executes the computer program, the processor implements the position determination method according to claim 1.

16. A V2X device, the V2X device being a second device, comprising:
a transceiver, a memory, a processor and a computer program stored on the memory and executable by the processor, wherein when the processor executes the computer program, the processor implements the position determination method according to claim 9.

* * * * *